United States Patent
Zhang et al.

(10) Patent No.: US 10,868,772 B2
(45) Date of Patent: Dec. 15, 2020

(54) CONTROL SIGNALING OF BEAM FAILURE DETECTION

(71) Applicant: Apple Inc., Cupertino, CA (US)

(72) Inventors: Yushu Zhang, Beijing (CN); Guotong Wang, Beijing (CN); Alexei Davydov, Nizhny Novgorod NIZ (RU); Hong He, Sunnyvale, CA (US); Gang Xiong, Portland, OR (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/408,037

(22) Filed: May 9, 2019

(65) Prior Publication Data
US 2019/0372830 A1 Dec. 5, 2019

Related U.S. Application Data

(63) Continuation of application No. 16/267,721, filed on Feb. 5, 2019.
(Continued)

(51) Int. Cl.
| | |
|---|---|
| *H04L 12/911* | (2013.01) |
| *H04W 76/18* | (2018.01) |
| *H04L 12/24* | (2006.01) |
| *H04W 72/04* | (2009.01) |
| *H04L 12/26* | (2006.01) |

(Continued)

(52) U.S. Cl.
CPC ........ *H04L 47/746* (2013.01); *H04L 41/0668* (2013.01); *H04L 41/0677* (2013.01); *H04L 43/08* (2013.01); *H04W 24/10* (2013.01); *H04W 36/0058* (2018.08); *H04W 72/042* (2013.01); *H04W 76/18* (2018.02);
(Continued)

(58) Field of Classification Search
CPC . H04W 76/18; H04W 36/0058; H04W 24/10; H04L 69/40; H04L 47/746
See application file for complete search history.

(56) References Cited

U.S. PATENT DOCUMENTS

| | | |
|---|---|---|
| 2018/0234960 A1 | 8/2018 | Nagaraja et al. |
| 2019/0097874 A1 | 3/2019 | Zhou et al. |
| | (Continued) | |

OTHER PUBLICATIONS

U.S. Appl. No. 62/663,28, Zhou et al., 2019 (Year: 2019).*
(Continued)

*Primary Examiner* — Ashley Shivers
(74) *Attorney, Agent, or Firm* — Sterne, Kessler, Goldstein & Fox P.L.L.C.

(57) ABSTRACT

Systems, apparatuses, and methods for control signaling of beam failure detection are disclosed. A beam pair link may be comprised of multiple bandwidth parts (BWPs) or component carriers (CCs). In one embodiment, a beam failure detection reference signal (BFD RS) may be configured, with subsequent BFD RS instances defining a BFD RS periodicity. A BFD periodicity for monitoring the BFD RS may be configured to be less than, or equal or greater than the BFD RS periodicity. A beam failure may be declared if a minimum number of BFD RS instances, either within the BFD periodicity, or nearest the BFD periodicity if no instances fall within the BFD periodicity, fall below a predetermined threshold. The BFD periodicity and BFD RS may be configured for all BWPs/CCs, a subset of BWPs/CCs, or each individual BWP/CC.

24 Claims, 12 Drawing Sheets

Related U.S. Application Data

(60) Provisional application No. 62/627,081, filed on Feb. 6, 2018.

(51) Int. Cl.
*H04W 24/10* (2009.01)
*H04W 36/00* (2009.01)

(52) U.S. Cl.
CPC .......... *H04L 41/0893* (2013.01); *H04L 43/10* (2013.01); *H04L 43/16* (2013.01)

(56) References Cited

U.S. PATENT DOCUMENTS

2019/0200392 A1   6/2019  Agiwal
2019/0245737 A1*  8/2019  Zhou ........................ H04B 7/06

OTHER PUBLICATIONS

3GPP, "Technical Specification Group Radio Access Network NR Radio Resource Control (RRC) protocol specification (Release 15)," 3GPP TS 38.331 V15.0.0 (Dec. 2017), 5G, 188 pages.
3GPP, "Technical Specification Group Radio Access Network; NR; Physical layer procedures for control (Release 15)," 3GPP TS 38.213 V15.0.0 (Dec. 2017), 5G, 56 pages.

* cited by examiner

CONTROL SIGNALING OF BEAM FAILURE DETECTION

CROSS-REFERENCE TO RELATED APPLICATIONS

This application is a continuation of U.S. patent application Ser. No. 16/267,721 filed on Feb. 5, 2019, entitled "CONTROL SIGNALING OF BEAM FAILURE DETECTION," which claims the priority benefit of the earlier filing date of U.S. Provisional Patent Application No. 62/627,081, filed on 6 Feb. 2018, which are hereby incorporated herein by reference in their entireties.

FIELD

The present disclosure relates to beam management in mobile networks, and in particular, detecting and signaling beam failure across multiple bandwidth parts.

BACKGROUND

Next-generation/5G mobile networks can employ a number of different techniques to both improve the robustness of wireless links between a base station and a user equipment (UE), as well as to make efficient use of the bandwidth of available wireless spectrum. One way of improving link robustness is to employ beam forming techniques, where a transmitting base station or UE creates a directional transmission directed towards the receiving station. Beam forming can help conserve power that would otherwise be wasted in a conventional omnidirectional transmission, allowing for a better signal to noise ratio and/or greater transmission distance for a given transmission power.

Beam forming may be combined with use of bandwidth parts or component carriers, where wireless spectrum is divided up into sub-bands. Each bandwidth part or component carrier may be able to support a discrete radio link between a UE and a base station. By employing multiple bandwidth parts or component carriers (sometimes referred to as link aggregation), overall bandwidth between a UE and base station can be improved. Use of bandwidth parts or component carriers can also offer greater link robustness, as poor performing bandwidth parts or component carriers can be dynamically switched or dropped in favor of better performing parts or carriers.

DETAILED DESCRIPTION

Figure 1:
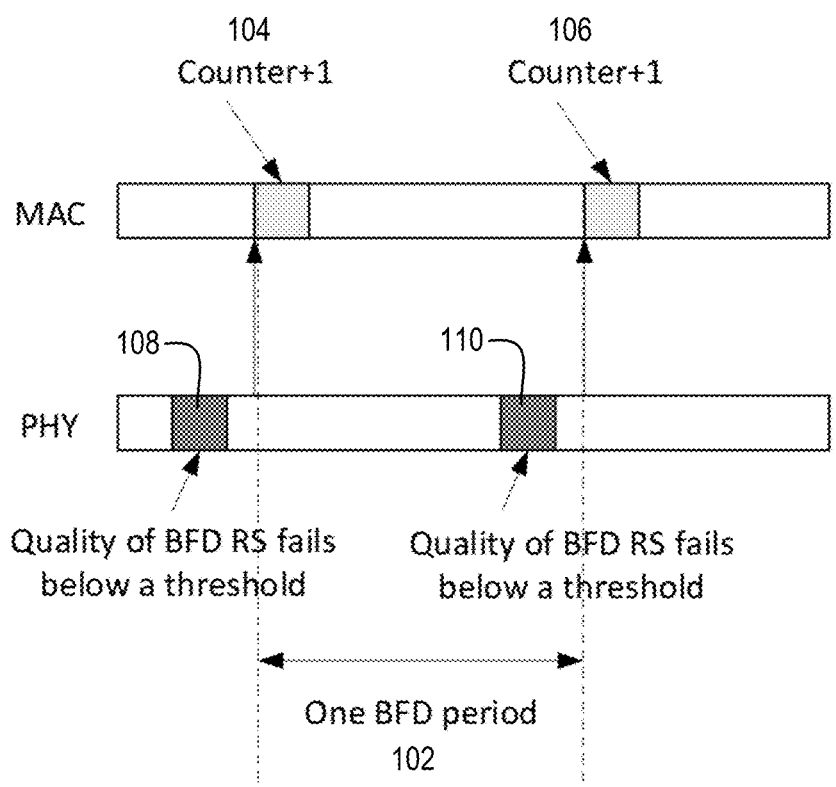
FIG. 1 depicts a beam failure detection model, according to various embodiments.

In the following detailed description, reference is made to the accompanying drawings which form a part hereof, and in which are shown by way of illustration embodiments that may be practiced. It is to be understood that other embodiments may be utilized and structural or logical changes may be made without departing from the scope. Therefore, the following detailed description is not to be taken in a limiting sense, and the scope of embodiments is defined by the appended claims and their equivalents.

Various operations may be described as multiple discrete operations in turn, in a manner that may be helpful in understanding embodiments; however, the order of description should not be construed to imply that these operations are order dependent.

The description may use perspective-based descriptions such as up/down, back/front, and top/bottom. Such descriptions are merely used to facilitate the discussion and are not intended to restrict the application of disclosed embodiments.

The terms "coupled" and "connected," along with their derivatives, may be used. It should be understood that these terms are not intended as synonyms for each other. Rather, in particular embodiments, "connected" may be used to indicate that two or more elements are in direct physical contact with each other. "Coupled" may mean that two or more elements are in direct physical contact. However, "coupled" may also mean that two or more elements are not in direct contact with each other, but yet still cooperate or interact with each other.

For the purposes of the description, a phrase in the form "A/B" or in the form "A and/or B" means (A), (B), or (A and B). For the purposes of the description, a phrase in the form "at least one of A, B, and C" means (A), (B), (C), (A and B), (A and C), (B and C), or (A, B and C). For the purposes of the description, a phrase in the form "(A)B" means (B) or (AB) that is, A is an optional element.

The description may use the terms "embodiment" or "embodiments," which may each refer to one or more of the same or different embodiments. Furthermore, the terms "comprising," "including," "having," and the like, as used with respect to embodiments, are synonymous.

In NR implementations, beam management may refer to a set of L1/L2 procedures to acquire and maintain a set of TRP(s) and/or UE beams that can be used for downlink (DL) and uplink (UL) transmission/reception, which may include beam determination, which may refer to TRxP(s) or UE ability to select of its own transmission (Tx)/reception (Rx)

beam(s); beam measurement, which may refer to transmission/reception point(s) (TRP or TRxP) or UE ability to measure characteristics of received beamformed signals; beam reporting, which may refer to the UE ability to report information of beamformed signal(s) based on beam measurement; and beam sweeping, which may refer to operation(s) of covering a spatial area, with beams transmitted and/or received during a time interval in a predetermined manner.

Tx/Rx beam correspondence at a TRxP holds if at least one of the following conditions are satisfied: TRxP is able to determine a TRxP Rx beam for the uplink reception based on UE's downlink measurement on TRxP's one or more Tx beams; and TRxP is able to determine a TRxP Tx beam for the downlink transmission based on TRxP's uplink measurement on TRxP's one or more Rx beams. Tx/Rx beam correspondence at a UE holds if at least one of the following is satisfied: UE is able to determine a UE Tx beam for the uplink transmission based on UE's downlink measurement on UE's one or more Rx beams; UE is able to determine a UE Rx beam for the downlink reception based on TRxP's indication based on uplink measurement on UE's one or more Tx beams; and Capability indication of UE beam correspondence related information to TRxP is supported.

In some implementations, DL beam management may include several possible procedures labeled P-1, P-2, and P-3. Procedure P-1 may be used to enable UE measurement on different TRxP Tx beams to support selection of TRxP Tx beams/UE Rx beam(s). For beamforming at TRxP, procedure P-1 typically includes an intra/inter-TRxP Tx beam sweep from a set of different beams. For beamforming at the UE, procedure P-1 typically includes a UE Rx beam sweep from a set of different beams.

Procedure P-2 may be used to enable UE measurement on different TRxP Tx beams to possibly change inter/intra-TRxP Tx beam(s). Procedure P-2 may be a special case of procedure P-1 wherein procedure P-2 may be used for a possibly smaller set of beams for beam refinement than procedure P-1. Procedure P-3 may be used to enable UE measurement on the same TRxP Tx beam to change UE Rx beam in the case where UE uses beamforming. Procedures P-1, P-2, and P-3 may be used for aperiodic beam reporting.

UE measurements based on RS for beam management (at least CSI-RS) is composed of K beams (where K is a total number of configured beams), and the UE may report measurement results of N selected Tx beams (where N may or may not be a fixed number). The procedure based on RS for mobility purposes is not precluded. Beam information that is to be reported may include measurement quantities for the N beam(s) and information indicating NDL Tx beam(s), if N<K. Other information or data may be included in or with the beam information. When a UE is configured with K'>1 non-zero power (NZP) CSI-RS resources, a UE can report N' CSI-RS Resource Indicator (CRIs).

In some NR implementations, a UE can trigger a mechanism to recover from beam failure, which may be referred to a "beam recovery", "beam failure recovery request procedure", "beam failure recovery" (BFR) and/or the like. A beam failure event may occur when the quality of beam pair link(s) of an associated control channel falls below a threshold, when a time-out of an associated timer occurs, or the like. Detection of a beam failure will be discussed in greater detail below. The beam recovery mechanism may be triggered when beam failure occurs. The network may explicitly configure the UE with resources for UL transmission of signals for recovery purposes. Configurations of resources are supported where the base station (e.g., a TRP, gNB, or the like) is listening from all or partial directions (e.g., a random access region). The UL transmission/resources to report beam failure can be located in the same time instance as a Physical Random Access Channel (PRACH) or resources orthogonal to PRACH resources, or at a time instance (configurable for a UE) different from PRACH. Transmission of a DL signal is supported for allowing the UE to monitor the beams for identifying new potential beams.

For beam failure recovery, a beam failure should be declared if all the serving PDCCH beams fail. The beam failure recovery request procedure may be initiated when a beam failure is declared. For example, the beam failure recovery request procedure may be used for indicating to a serving gNB (or TRP) of a new SSB or CSI-RS when beam failure is detected on a serving SSB(s)/CSI-RS(s). A beam failure may be detected by the lower layers (e.g., the PHY layer) and indicated to a Media Access Control (MAC) entity of the UE.

In some implementations, beam management may include providing or not providing beam-related indications. When a beam-related indication is provided, information pertaining to UE-side beamforming/receiving procedure used for CSI-RS-based measurement can be indicated through QCL to the UE. The same or different beams on the control channel and the corresponding data channel transmissions may be supported.

Downlink (DL) beam indications may be based on a Transmission Configuration Indication (TCI) state(s). The TCI state(s) may be indicated in a TCI list that is configured by radio resource control (RRC) and/or Media Access Control (MAC) Control Element (CE). In some implementations, a UE can be configured up to M TCI-States by higher layer signaling to decode PDSCH according to a detected PDCCH with downlink control information (DCI) intended for the UE and the given serving cell where M depends on the UE capability. Each configured TCI state includes one reference signal (RS) set TCI-RS-SetConfig. Each TCI-RS-SetConfig may include parameters for configuring quasi co-location relationship(s) between the RSs in the RS set and the demodulation reference signal (DM-RS) port group of the PDSCH. The RS set may include a reference to either one or two DL RSs and an associated quasi co-location type (QCL-Type) for each DL RS(s) configured by the higher layer parameter QCL-Type. For the case of two DL RSs, the QCL types shall not be the same, regardless of whether the references are to the same DL RS or different DL RSs. The quasi co-location types indicated to the UE are based on the higher layer parameter QCL-Type and may take one or a combination of the following types: QCL-TypeA: {Doppler shift, Doppler spread, average delay, delay spread}; QCL-TypeB: {Doppler shift, Doppler spread}; QCL-TypeC: {average delay, Doppler shift}; QCL-TypeD: {Spatial Rx parameter}.

The UE may receive a selection command (e.g., in a MAC CE), which may be used to map up to 8 TCI states to the codepoints of the DCI field TCI-states. Until a UE receives higher layer configuration of TCI states and before reception of the activation command, the UE may assume that the antenna ports of one DM-RS port group of PDSCH of a serving cell are spatially quasi co-located with the SSB determined in the initial access procedure. When the number of TCI states in TCI-States is less than or equal to 8, the DCI field TCI-states directly indicates the TCI state.

A beam failure recovery request could be delivered over dedicated PRACH or Physical Uplink Control Channel (PUCCH) resources. For example, a UE can be configured, for a serving cell, with a set $\bar{q}_0$ of periodic CSI-RS resource configuration indexes by higher layer parameter Beam-Failure-Detection-RS-ResourceConfig and with a set $\bar{q}_1$ of CSI-RS resource configuration indexes and/or SS/PBCH block indexes by higher layer parameter Candidate-Beam-RS-List for radio link quality measurements on the serving cell. If there is no configuration, the beam failure detection could be based on CSI-RS or SSB, which is spatially Quasi Co-Located (QCLed) with the PDCCH Demodulation Reference Signal (DMRS). For example, if the UE is not provided with the higher layer parameter Beam-Failure-Detection-RS-ResourceConfig, the UE may determine $\bar{q}_0$ to include SS/PBCH blocks and periodic CSI-RS configurations with the same values for higher layer parameter TCI-StatesPDCCH as for control resource sets (CORESET) that the UE is configured for monitoring PDCCH.

The physical layer of a UE may assess the radio link quality according to a set $\bar{q}_0$ of resource configurations against a threshold $Q_{out,LR}$. The threshold $Q_{out,LR}$ corresponds to a default value of higher layer parameter RLM-IS-OOS-thresholdConfig and Beam-failure-candidate-beam-threshold, respectively. For the set $\bar{q}_0$, the UE may assess the radio link quality only according to periodic CSI-RS resource configurations or SS/PBCH blocks that are quasi co-located, with the DM-RS of PDCCH receptions DM-RS monitored by the UE. The UE applies the configured $Q_{in,LR}$ threshold for the periodic CSI-RS resource configurations. The UE applies the $Q_{out,LR}$ threshold for SS/PBCH blocks after scaling a SS/PBCH block transmission power with a value provided by higher layer parameter Pc_SS.

In some implementations, if a beam failure indication has been received by a MAC entity from lower layers, then the MAC entity may start a beam failure recovery timer (beamFailureRecoveryTimer) and initiate a Random Access procedure. If the beamFailureRecoveryTimer expires, then the MAC entity may indicate a beam failure recovery request failure to upper layers. If a downlink assignment or uplink grant has been received (e.g., on a PDCCH addressed for a cell radio network temporary identifier (C-RNTI)), then the MAC entity may stop and reset beamFailureRecovery-Timer and consider the beam failure recovery request procedure to be successfully completed.

In fifth generation (5G) mobile communications systems, both next generation Node Bs (gNBs) and user equipment (UE) may maintain a plurality of beams. A relatively good gNB-UE beam pair link (BPL) can help to increase link budget (such as in terms of bandwidth), while a bad BPL may result in an outage of communications between a gNB and UE. When the beam used for control channels fails, the UE can trigger the beam failure recovery (BFR) procedure. Beam failure detection (BFD) can be based on one or more reference signals (RS), including a Channel State Information Reference Signal (CSI-RS) as well as a Synchronization Signal Block (SSB). A counter maintained by the medium access control (MAC) layer can be used to determine whether the beam failure happens.

Because a UE may be configured with multiple beams and multiple Control Resource Sets (CORESET), multiple BFD Reference Signals (BFD RS) may be configured. The repeating nature of the BFD RS in a time domain defines a periodicity, which may vary over time in some instances. This varying periodicity in turn may impact configuration of the periodicity over which the BFD RS is monitored for possible declaration of a beam failure. Further, a UE may be configured with multiple bandwidth parts (BWP) and multiple component carriers (CC). Each BWP/CC itself can act as a discrete channel, and may be subject to individual monitoring for BFD. In some embodiments, some or all BWP/CC may have their own BFD RS.

In addition, a UE can be configured with a dedicated CORESET to monitor BFR and receive the BFR response where a beam failure is declared. Whether BFR is based on a per-BWP/CC or is UE-specific impacts on how the CORESET search space set is configured for the UE.

Various embodiments herein provide various mechanisms for beam failure detection and configuration for BFR. Embodiments may include configuration of beam failure detection period; beam failure detection for multiple BWPs and multiple component carriers (CCs) case; and configuration of CORESET and search space for BFR.

FIG. 1 illustrates a first example for a beam failure detection model in accordance with some embodiments. For a given channel, a beam failure detection (BFD) periodicity is defined by a repeating BFD period 102, period 102 defined by the distance between cycles of a BFD counter. Thus, one BFD period 102 is defined by a first start of 104 a BFD counter to a second start 106 of the BFD counter. In embodiments, this is expressed in a time domain, although other embodiments may express this distance in a frequency domain, depending on the particulars of an implementing mobile technology. As seen in the embodiment depicted in FIG. 1, the BFD counter and corresponding BFD period 102 are defined on the MAC layer. Beam failure is detected, in embodiments, with at least one repeating BFD RS, illustrated on the PHY layer in FIG. 1 as first BFD RS 108 and second BFD RS 110. Second BFD RS 110, as may be seen, falls within BFD period 102. If the quality of either first BFD RS 108, second BFD RS 110, or both, falls below a predetermined threshold, a beam failure may be declared. Whether either or both RS need fall below the predetermined threshold may vary depending on a particular implementation of BFD.

The BFD counter (104, 106), in embodiments, keeps count of the number of instances the BFD RS quality falls below the predetermined threshold. The BFD counter, depending upon a given implementation, may be reset at the start of each BFD period 102. In other implementations, the BFD counter may only be reset if no BFD RS within the BFD period 102 falls below the predetermined threshold; otherwise, the BFD counter value carries over to the subsequent BFD period 102 if at least one (or a greater predetermined number, in some embodiments) BFD RS falls below the predetermined threshold. For example, during the BFD period 102, the BFD counter 104 would be incremented by one following detection that the quality of second BFD RS 110 falls below the predetermined threshold. This value then may be carried over into the subsequent BFD period, as BFD counter 106 shows a value of "Counter+1". It may also be observed that BFD counter 104 is indicated as "Counter+1", reflecting that first BFD RS 108 also fell below the predetermined threshold.

As will be explained further herein, a given implementation may include multiple distinct repeating RSs. Further still, the periodicity defined by a given RS may fluctuate depending upon various factors, e.g. UE configuration, gNB configuration, link state, channel conditions (varying bit rates due to changing coding schemes), to name a few. Examples of the interrelationship between BFD periodicity and BFD RS periodicity will be discussed below with respect to FIGS. 2 and 3.

Figure 2:
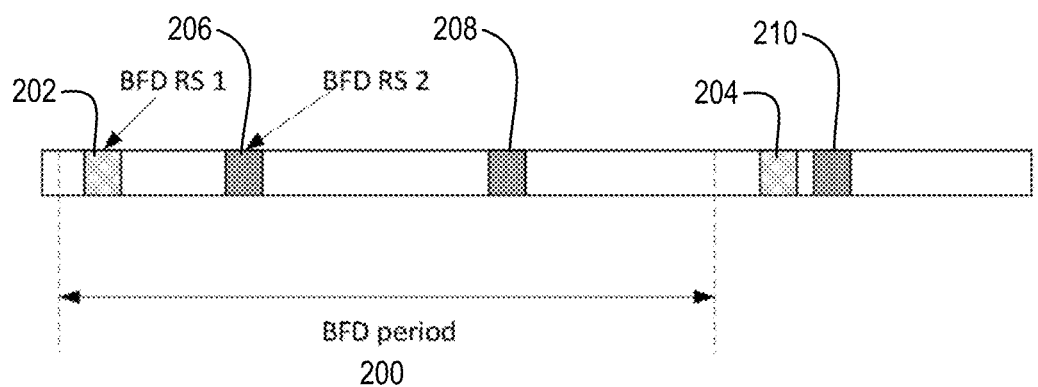
FIG. 2 depicts a first example of a beam failure detection using the model of FIG. 1, according to various embodiments.

In FIG. 2, a first possible embodiment for beam failure detection is depicted. In the embodiment of FIG. 2, a BFD period 200 has a periodicity that exceeds the periodicity of at least BFD RS 2, defined by the spacing between a BFD RS 206, BFD RS 208, and BFD RS 210. Thus, BFD period 200 is guaranteed to include at least one instance of BFD RS 2; in FIG. 2, two instances, BFD RS 206 and 208, fall within BFD period 200. Conversely, the periodicity of BFD RS 202 and BFD RS 204, in the depicted embodiment, exceeds the BFD period 200. Depending upon the relative timing of BFD period 200, one instance of a BFD RS (e.g. BFD RS 202) may still fall within BFD RS 200, or BFD period 200 may encompass a part of each of BFD RS 202 and 204. Depending upon the implementation, a BFD RS may nevertheless be considered to be within BFD period 200 when only a portion of the BFD RS falls within BFD period 200. In the embodiment of FIG. 2, a decision on whether to declare a beam failure may be based entirely upon the quality of BFD RS instances that fall within a given BFD period 200.

Figure 3:
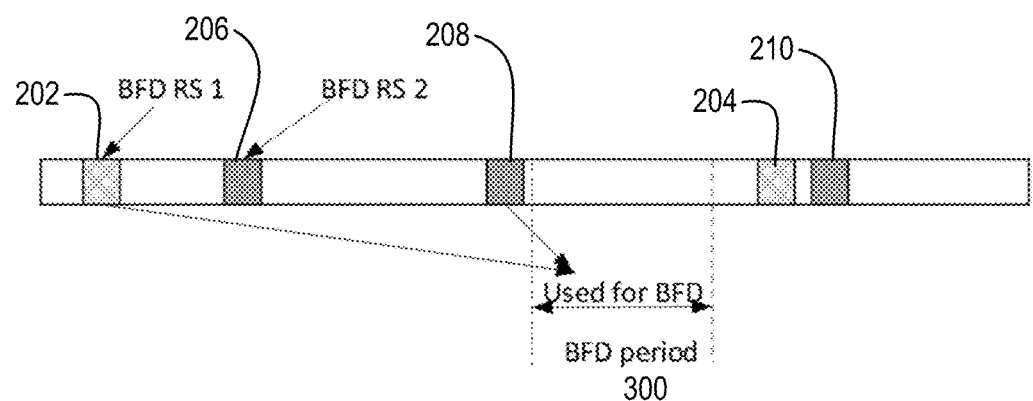
FIG. 3 depicts second and third examples of a beam failure detection using the model of FIG. 1, according to various embodiments.

In FIG. 3, a second possible embodiment for beam failure detection is depicted. In the embodiment of FIG. 3, a BFD period 300 has a periodicity that is less than the periodicity of any two BFD RS instances. As can be seen, the periodicity defined by first instance 202 and second instance 204 of the first BFD RS, as well as the periodicity defined by first instance 206, second instance 208, and third instance 210 of the second BFD RS both exceed the BFD period 300. Thus, because BFD period 300 falls in a gap between the second and third instances 208, 210, of second BFD RS, no BFD RS occurs within BFD period 300. To determine whether a beam failure has occurred, then, in the second possible embodiment the quality of an RS instance most recent to a given BFD period 300 may be used. In the depicted embodiment, the quality of either second instance 208 of the second BFD RS, or the quality of first instance 202 of the first BFD RS may be assessed to determine whether a beam failure should be declared.

FIG. 3 also illustrates two principles: first, and as will be appreciated by a person skilled in the art, where BFD RS instances and periodicity is defined in a time domain, only past BFD RS instances are considered to determine whether a beam failure should be declared, as the future condition of a given channel, BWP, or CC is unknown. Second, where multiple BFD RSs are employed, the most recent BFD RS instance for a given BFD RS may not necessarily be the most recent BFD RS instance of any BFD RS to the BFD period 300. Thus, while first instance 202 is the most recent BFD RS instance to BFD period 300 for the first BFD RS, the most recent BFD RS instance to BFD period 300 of all depicted BFD RSs is second instance 208, of the second BFD RS.

Where a given embodiment employs multiple BFD RSs and multiple BWP/CCs, each BFD RS may be associated with a different BWP or CC. Referring again to FIGS. 2 and 3, first BFD RS, depicted as first instance 202 and second instance 204, may be associated with a first BWP or CC. Likewise, second BFD RS, depicted as first instance 206, second instance 208, and third instance 210, may be associated with a second BWP or CC. Additional BWPs/CCs may likewise have third, fourth, to nth BFD RSs, with at least a one to one correspondence between a given BWP/CC and a BFD RS. In some such embodiments, each BWP or CC includes a dedicated BFD counter. In such embodiments, the arrangement of BFD RS instance to BFD counter may be as depicted in FIG. 1 for each separate BWP/CC.

Figure 4:
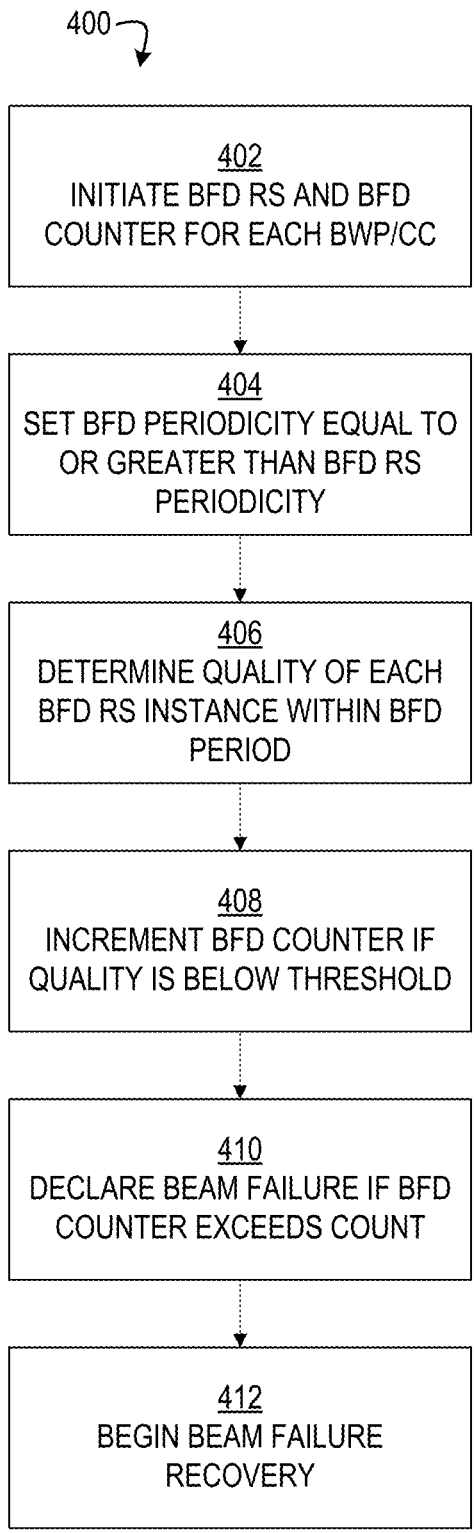
FIG. 4 depicts the operations for a procedure to determine a beam failure on a beam pair link with the example of FIG. 2, according to various embodiments.

FIG. 4 depicts the operations for a process 400 for detecting and declaring a beam failure on a beam pair link that may be comprised of multiple BWPs or CCs, using the BFD RS arrangements depicted in FIGS. 1-3. The operations of process 400 may be carried out, in whole or in part, by a gNB, a UE, a combination of the gNB or UE, or another portion of a mobile network, depending upon the needs of a given implementation. The operations of process 400 may be implemented in hardware, software (such as on a non-transitory computer-readable medium, or CRM), or a combination of the two, where such software may be executed on hardware of a gNB, UE, or another mobile network component. Additional operations may be employed that are not depicted are also described below in connection with each operation.

In example operation 402, a BFD RS and BFD counter is initiated for each BWP/CC. Such an embodiment includes an independent counter and BFD RS for each BWP/CC, allowing the beam condition for each BWP/CC to be independently monitored. Other embodiments may employ a separate BFD RS for each BWP, but use a single BFD counter for multiple BWPs/CCs, such as a subset of, or all available BWPs/CCs. For a given BFD RS, multiple BFD RS instances may be transmitted in a given BFD period, such as the second BFD RS depicted in FIG. 2. As will be discussed below, in embodiments a BFD can only be declared when quality of N instances of the BFD RS falls below a threshold, i.e. $1<=N<=N\_max$, where N_max indicates the number of instances of one BFD RS resource in one BFD period, and N can be fixed, e.g., $N=N\_max$ or $N=1$, or configured by higher layer signaling, or determined by UE.

In example operation 404, the BFD periodicity is set equal to or greater than the longest BFD RS periodicity. In some embodiments, the BFD periodicity is determined based upon the longest BFD RS periodicity from all BFD RSs across all BWPs/CCs. In other embodiments, the BFD periodicity is determined based upon the longest BFD RS periodicity from a subset of all BFD RSs. In still other embodiments, the BFD periodicity is determined on a per-BWP/CC basis. It will be appreciated that in the latter two approaches multiple BFD periodicities for monitoring for BFD may be employed, either for each subset of the BWPs/CCs, or with a separate periodicity for each BWP/CC, where each BWP/CC is individually subject to BFD.

In example operation 406, the quality of each BFD RS instance occurring within a BFD period is evaluated for quality. Each BFD period may or may not be contiguous with other BFD periods, viz. in some embodiments, a given BFD period is separate from other BFD periods in a time domain, with intervening periods where BFD RS is not monitored. Moreover, where multiple BFD periods are employed, such as when individual BWPs/CCs or a subset of all BWPs/CCs are separately monitored, BFD periods associated with different BWPs/CCs may or may not overlap.

In operation 408, for each BFD RS instance that has a quality below the predetermined threshold, the BFD counter associated with the BWP/CC (if individually monitored), the subset BWP/CC, or all BWPs/CCs (if only one counter) is incremented. Alternatively, in some embodiments, if no BFD RS instance within a given BFD period is found to have quality below the predetermined threshold, the BFD counter may be reset to its starting value. In other embodiments, the BFD counter may be reset if a UE involved in process 400 declares a radio link failure. In still other embodiments, the BFD counter may only be incremented if all, or some minimum threshold number, of the BFD RS instances within a given BFD period fall below the predetermined quality threshold. For example, if three BFD RS instances are within a given BFD period and the threshold count is two, the BFD counter would not be incremented if only one BFD RS instance falls below the predetermined threshold. Conversely, if two or three of the three BFD RS instances fall below the predetermined threshold, then the BFD counter would be incremented. As will be understood, these operations may separately apply to each BWP/CC, or a subset of BWPs/CCs.

In operation 410, if the value of the BFD counter exceeds a threshold amount, then a beam failure may be declared. In embodiments, the PHY layer (where the BFD RS instances are realized) may declare the BFD to the MAC layer, such as for a given UE.

Finally, following declaration of a beam failure, a beam failure recovery procedure may be commenced, in operation 412. As will be understood, the beam failure recovery procedure may be commenced on a per BWP/CC basis, or a subset of BWPs/CCs, depending upon the particular embodiment. In various embodiments, when a UE is configured with multiple BWPs/CCs, the BFD and BFR can be applied for each BWPs/CCs independently. In each BWP/CC, the BFD can be based on the BFD RS within this BWP/CC, and the BFD counter and the BFR timer can be maintained per BWP/CC. Alternatively, one BFD and BFR process can be applied to a subset of, or all of, the BWPs/CC, and those BWPs/CCs can be selected based on whether inter-BWP or inter-CC Quasi-Co-Location (QCL) can be assumed, based on gNB indication, or predefined. If the BFD is BWP/CC specific, and when the beam failure happens in a subset of BWPs/CCs, the UE may trigger a PRACH based beam failure recovery, or use the PUCCH based beam reporting in the BWP/CC without beam failure to carry the beam failure recovery request.

In embodiments, if the BFD is declared when a beam failure is detected in a sub-set of or all BWP/CC, the number of BFD RS resources or number of CORESETs should not exceed a value M, where M can be based on a UE capability or be predefined. Because a UE implementing or participating in process 400 (or 500, described below) can be configured with one dedicated CORESET to receive the BFR response (following operation 412), it may be necessary to configure a search space set to the CORESET-BFR. In various embodiments, a UE is configured with at least one search space set for CORESET-BFR. Alternatively, a search space set x can be mapped to the COREST-BFR. Additionally, where x can be predefined, e.g., x can be the search space set with the lowest ID or highest ID, or configured by higher layer signaling.

In other embodiments, if the BFR is based on per BWP/CC, the CORESET-BFR and corresponding search space set can be configured on a per BWP/CC basis. If the BFR is UE specific, only one CORESET-BFR from one or more BWPs or CCs may be configured.

Figure 5:
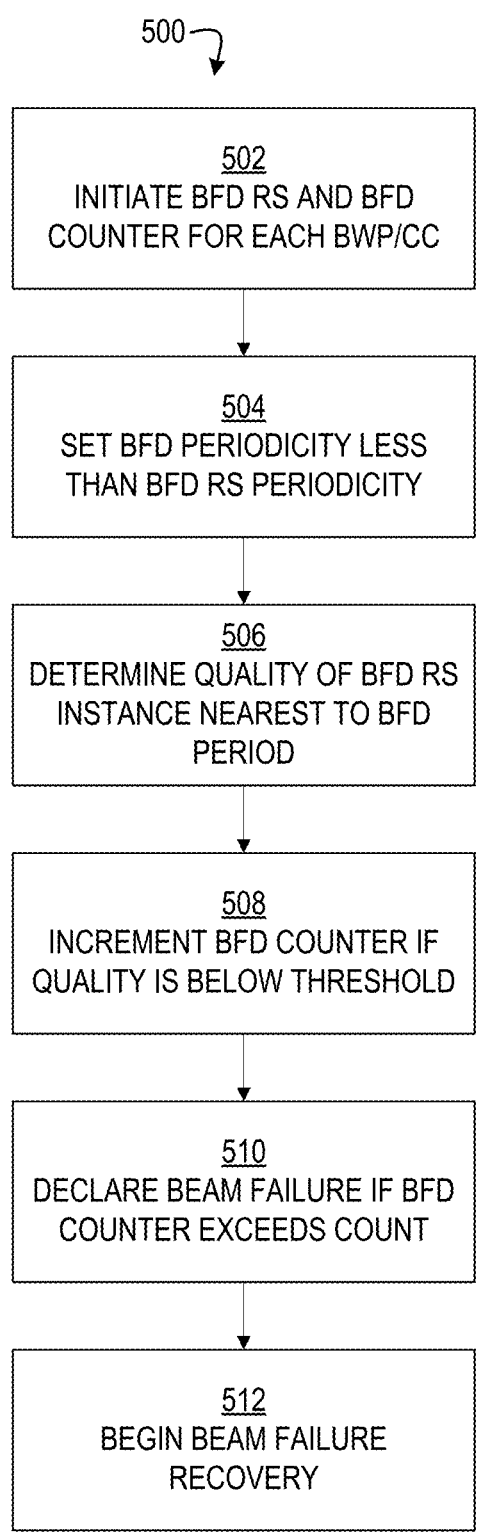
FIG. 5 depicts the operations for a procedure to determine a beam failure on a beam pair link with the example of FIG. 3, according to various embodiments.

FIG. 5, similar to FIG. 4, depicts the operations for a process 500 for detecting and declaring a beam failure on a beam pair link that may be comprised of multiple BWPs or CCs, using the BFD RS arrangements depicted in FIGS. 1-3. The operations of process 500 may be carried out, in whole or in part, by a gNB, a UE, a combination of the gNB or UE, or another portion of a mobile network, depending upon the needs of a given implementation. The operations of process 500 may be implemented in hardware, software (such as on a non-transitory computer-readable medium, or CRM), or a combination of the two, where such software may be executed on hardware of a gNB, UE, or another mobile network component. Additional operations may be employed that are not depicted are also described below in connection with each operation.

Operations 502, 510, and 512 are all substantially identical to operations 502, 510, and 512. Differing from process 400, in operation 504 the BFD periodicity is set to a time that is less than the BFD RS periodicity, and so not all BFD RS instances may fall within a given BFD period. Further, as the BFD period in operation 502 may be less than the BFD RS periodicity, there may be BFD periodicities that do not encompass any BFD RS instances. As a result, in operation 506, the quality of the BFD RS instance most proximate to the BFD period is assessed to determine if it falls below the predetermined threshold. In some embodiments, a set of the most recent BFD RS instances most proximate to the BFD period may be assess, viz. the last nth number of BFD RS instances back from the start of the BFD period may be assessed.

As with operation 408, in operation 508 the BFD counter may be incremented if the quality of the most recent BFD RS instance falls below the predetermined threshold. In embodiments evaluating multiple previous BFD RS instances, as with operation 408, some minimum number of the last nth number of BFD RS instances may be required to fall below the predetermined threshold prior to the BFD counter being incremented.

Similar to the operations of process 400, the various operations of process 500 may be applied to all BWP/CCs collectively, a subset of BWPs/CCs, or to each BWP/CC on an individual basis.

Figure 6:
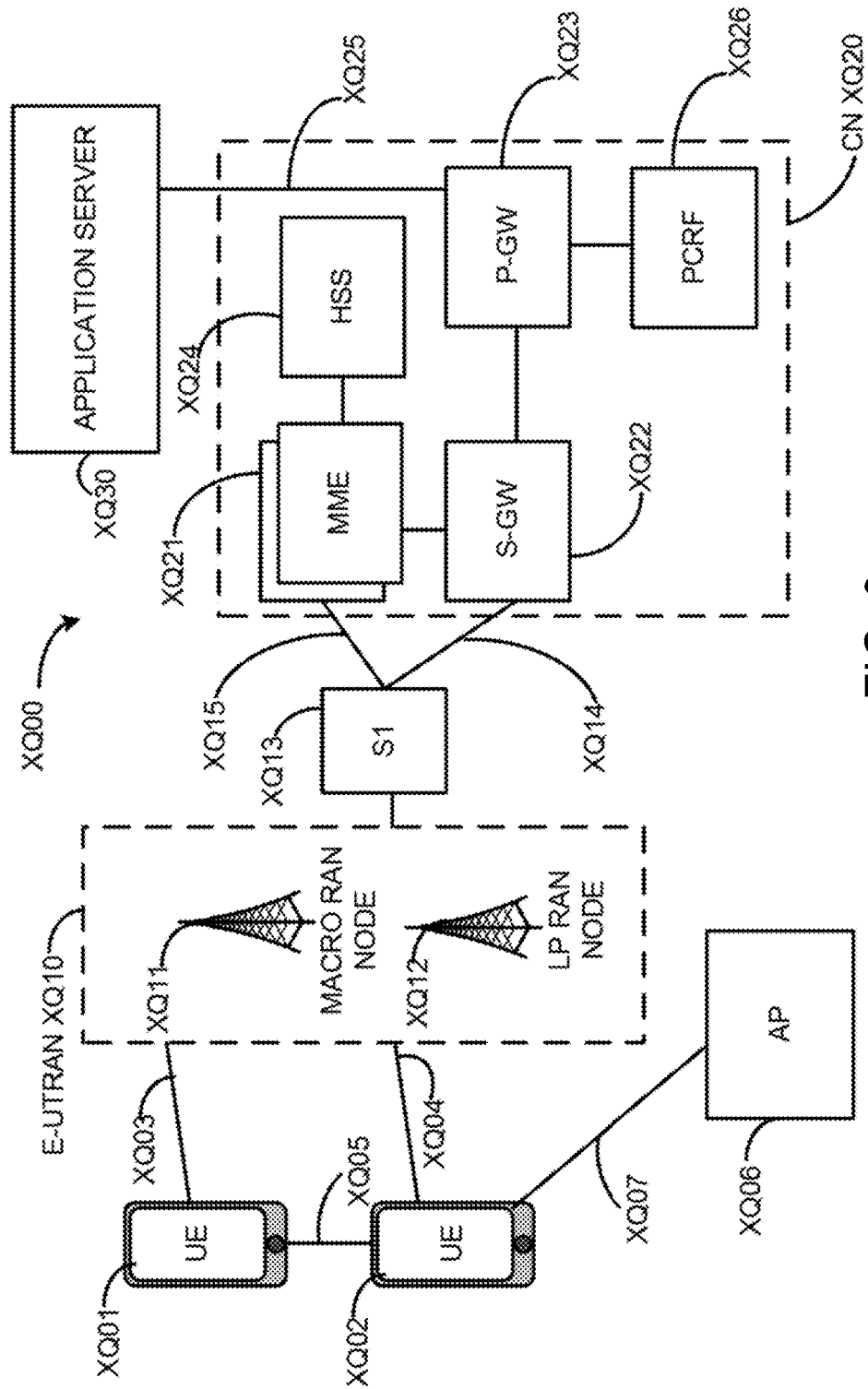
FIG. 6 depicts an architecture of a system of a network in accordance with some embodiments.

FIG. 6 illustrates an architecture of a system XQ00 of a network in accordance with some embodiments. The system XQ00 is shown to include a user equipment (UE) XQ01 and a UE XQ02. As used herein, the term "user equipment" or "UE" may refer to a device with radio communication capabilities and may describe a remote user of network resources in a communications network. The term "user equipment" or "UE" may be considered synonymous to, and may be referred to as client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface. In this example, UEs XQ01 and XQ02 are illustrated as smartphones (e.g., handheld touchscreen mobile computing devices connectable to one or more cellular networks), but may also comprise any mobile or non-mobile computing device, such as consumer electronics devices, cellular phones, smartphones, feature phones, tablet computers, wearable computer devices, personal digital assistants (PDAs), pagers, wireless handsets, desktop computers, laptop computers, in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, engine management systems (EMS), networked or "smart" appliances, machine-type communications (MTC) devices, machine-to-machine (M2M), Internet of Things (IoT) devices, and/or the like.

In some embodiments, any of the UEs XQ01 and XQ02 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs XQ01 and XQ02 may be configured to connect, e.g., communicatively couple, with a radio access network (RAN) XQ10—the RAN XQ10 may be, for example, an Evolved Universal Mobile Telecommunications System (UMTS) Terrestrial Radio Access Network (E-UTRAN), a NextGen RAN (NG RAN), or some other type of RAN. The UEs XQ01 and XQ02 utilize connections (or channels) XQ03 and XQ04, respectively, each of which comprises a physical communications interface or layer (discussed in further detail infra). As used herein, the term "channel" may refer to any transmission medium, either tangible or intangible, which is used to communicate data or a data stream. The term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" may refer to a connection between two devices through a Radio Access Technology (RAT) for the purpose of transmitting and receiving information. In this example, the connections XQ03 and XQ04 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UEs XQ01 and XQ02 may further directly exchange communication data via a ProSe interface XQ05. The ProSe interface XQ05 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH). In various implementations, the SL interface XQ05 may be used in vehicular applications and communications technologies, which are often referred to as V2X systems. V2X is a mode of communication where UEs (for example, UEs XQ01, XQ02) communicate with each other directly over the PC5/SL interface 105 and can take place when the UEs XQ01, XQ02 are served by RAN nodes XQ11, XQ12 or when one or more UEs are outside a coverage area of the RAN XQ10. V2X may be classified into four different types: vehicle-to-vehicle (V2V), vehicle-to-infrastructure (V2I), vehicle-to-network (V2N), and vehicle-to-pedestrian (V2P). These V2X applications can use "co-operative awareness" to provide more intelligent services for end-users. For example, vUEs XQ01, XQ02, RAN nodes XQ11, XQ12, application servers XQ30, and pedestrian UEs XQ01, XQ02 may collect knowledge of their local environment (for example, information received from other vehicles or sensor equipment in proximity) to process and share that knowledge in order to provide more intelligent services, such as cooperative collision warning, autonomous driving, and the like. In these implementations, the UEs XQ01, XQ02 may be implemented/employed as Vehicle Embedded Communications Systems (VECS) or vUEs.

The UE XQ02 is shown to be configured to access an access point (AP) XQ06 (also referred to as also referred to as "WLAN node XQ06", "WLAN XQ06", "WLAN Termination XQ06" or "WT XQ06" or the like) via connection XQ07. The connection XQ07 can comprise a local wireless connection, such as a connection consistent with any IEEE 802.11 protocol, wherein the AP XQ06 would comprise a wireless fidelity (WiFi®) router. In this example, the AP XQ06 is shown to be connected to the Internet without connecting to the core network of the wireless system (described in further detail below). In various embodiments, the UE XQ02, RAN XQ10, and AP XQ06 may be configured to utilize LTE-WLAN aggregation (LWA) operation and/or WLAN LTE/WLAN Radio Level Integration with IPsec Tunnel (LWIP) operation. The LWA operation may involve the UE XQ02 in RRC_CONNECTED being configured by a RAN node XQ11, XQ12 to utilize radio resources of LTE and WLAN. LWIP operation may involve the UE XQ02 using WLAN radio resources (e.g., connection XQ07) via Internet Protocol Security (IPsec) protocol tunneling to authenticate and encrypt packets (e.g., interne protocol (IP) packets) sent over the connection XQ07. IPsec tunneling may include encapsulating entirety of original IP packets and adding a new packet header thereby protecting the original header of the IP packets.

The RAN XQ10 can include one or more access nodes that enable the connections XQ03 and XQ04. As used herein, the terms "access node," "access point," or the like may describe equipment that provides the radio baseband functions for data and/or voice connectivity between a network and one or more users. These access nodes can be referred to as base stations (BS), NodeBs, evolved NodeBs (eNBs), next Generation NodeBs (gNB), RAN nodes, Road Side Units (RSUs), and so forth, and can comprise ground stations (e.g., terrestrial access points) or satellite stations providing coverage within a geographic area (e.g., a cell). The term "Road Side Unit" or "RSU" may refer to any transportation infrastructure entity implemented in or by an gNB/eNB/RAN node or a stationary (or relatively stationary) UE, where an RSU implemented in or by a UE may be referred to as a "UE-type RSU", an RSU implemented in or by an eNB may be referred to as an "eNB-type RSU." The RAN XQ10 may include one or more RAN nodes for providing macrocells, e.g., macro RAN node XQ11, and one or more RAN nodes for providing femtocells or picocells (e.g., cells having smaller coverage areas, smaller user capacity, or higher bandwidth compared to macrocells), e.g., low power (LP) RAN node XQ12.

Any of the RAN nodes XQ11 and XQ12 can terminate the air interface protocol and can be the first point of contact for the UEs XQ01 and XQ02. In some embodiments, any of the RAN nodes XQ11 and XQ12 can fulfill various logical functions for the RAN XQ10 including, but not limited to, radio network controller (RNC) functions such as radio bearer management, uplink and downlink dynamic radio resource management and data packet scheduling, and mobility management.

In accordance with some embodiments, the UEs XQ01 and XQ02 can be configured to communicate using Orthogonal Frequency-Division Multiplexing (OFDM) communication signals with each other or with any of the RAN nodes XQ11 and XQ12 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes XQ11 and XQ12 to the UEs XQ01 and XQ02, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UEs XQ01 and XQ02. The physical downlink control channel (PDCCH) may carry information about the transport format and resource allocations related to the PDSCH channel, among other things. It may also inform the UEs XQ01 and XQ02 about the transport format, resource allocation, and H-ARQ (Hybrid Automatic Repeat Request) information related to the uplink shared channel. Typically, downlink scheduling (assigning control and shared channel resource blocks to the UE 102 within a cell) may be performed at any of the RAN nodes XQ11 and XQ12 based on channel quality information fed back from any of the UEs XQ01 and XQ02. The downlink resource assignment information may be sent on the PDCCH used for (e.g., assigned to) each of the UEs XQ01 and XQ02.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced the control channel elements (ECCEs). Similar to above, each ECCE may correspond to nine sets of four physical resource elements known as an enhanced resource element groups (EREGs). An ECCE may have other numbers of EREGs in some situations.

The RAN XQ10 is shown to be communicatively coupled to a core network (CN) XQ20—via an S1 interface XQ13. In embodiments, the CN XQ20 may be an evolved packet core (EPC) network, a NextGen Packet Core (NPC) network, or some other type of CN. In this embodiment the S1 interface XQ13 is split into two parts: the S1-U interface XQ14, which carries traffic data between the RAN nodes XQ11 and XQ12 and the serving gateway (S-GW) XQ22, and the S1-mobility management entity (MME) interface XQ15, which is a signaling interface between the RAN nodes XQ11 and XQ12 and MMEs XQ21.

In this embodiment, the CN XQ20 comprises the MMEs XQ21, the S-GW XQ22, the Packet Data Network (PDN) Gateway (P-GW) XQ23, and a home subscriber server (HSS) XQ24. The MMEs XQ21 may be similar in function to the control plane of legacy Serving General Packet Radio Service (GPRS) Support Nodes (SGSN). The MMEs XQ21 may manage mobility aspects in access such as gateway selection and tracking area list management. The HSS XQ24 may comprise a database for network users, including subscription-related information to support the network entities' handling of communication sessions. The CN XQ20 may comprise one or several HSSs XQ24, depending on the number of mobile subscribers, on the capacity of the equipment, on the organization of the network, etc. For example, the HSS XQ24 can provide support for routing/roaming, authentication, authorization, naming/addressing resolution, location dependencies, etc.

The S-GW XQ22 may terminate the S1 interface XQ13 towards the RAN XQ10, and routes data packets between the RAN XQ10 and the CN XQ20. In addition, the S-GW XQ22 may be a local mobility anchor point for inter-RAN node handovers and also may provide an anchor for inter-3GPP mobility. Other responsibilities may include lawful intercept, charging, and some policy enforcement.

The P-GW XQ23 may terminate an SGi interface toward a PDN. The P-GW XQ23 may route data packets between the EPC network XQ23 and external networks such as a network including the application server XQ30 (alternatively referred to as application function (AF)) via an Internet Protocol (IP) interface XQ25. Generally, the application server XQ30 may be an element offering applications that use IP bearer resources with the core network (e.g., UMTS Packet Services (PS) domain, LTE PS data services, etc.). In this embodiment, the P-GW XQ23 is shown to be communicatively coupled to an application server XQ30 via an IP communications interface XQ25. The application server XQ30 can also be configured to support one or more communication services (e.g., Voice-over-Internet Protocol (VoIP) sessions, PTT sessions, group communication sessions, social networking services, etc.) for the UEs XQ01 and XQ02 via the CN XQ20.

The P-GW XQ23 may further be a node for policy enforcement and charging data collection. Policy and Charging Enforcement Function (PCRF) XQ26 is the policy and charging control element of the CN XQ20. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE' s IP-CAN session: a Home PCRF (H-PCRF) within a HPLMN and a Visited PCRF (V-PCRF) within a Visited Public Land Mobile Network (VPLMN). The PCRF XQ26 may be communicatively coupled to the application server XQ30 via the P-GW XQ23. The application server XQ30 may signal the PCRF XQ26 to indicate a new service flow and select the appropriate Quality of Service (QoS) and charging parameters. The PCRF XQ26 may provision this rule into a Policy and Charging Enforcement Function (PCEF) (not shown) with the appropriate traffic flow template (TFT) and QoS class of identifier (QCI), which commences the QoS and charging as specified by the application server XQ30.

Figure 7:
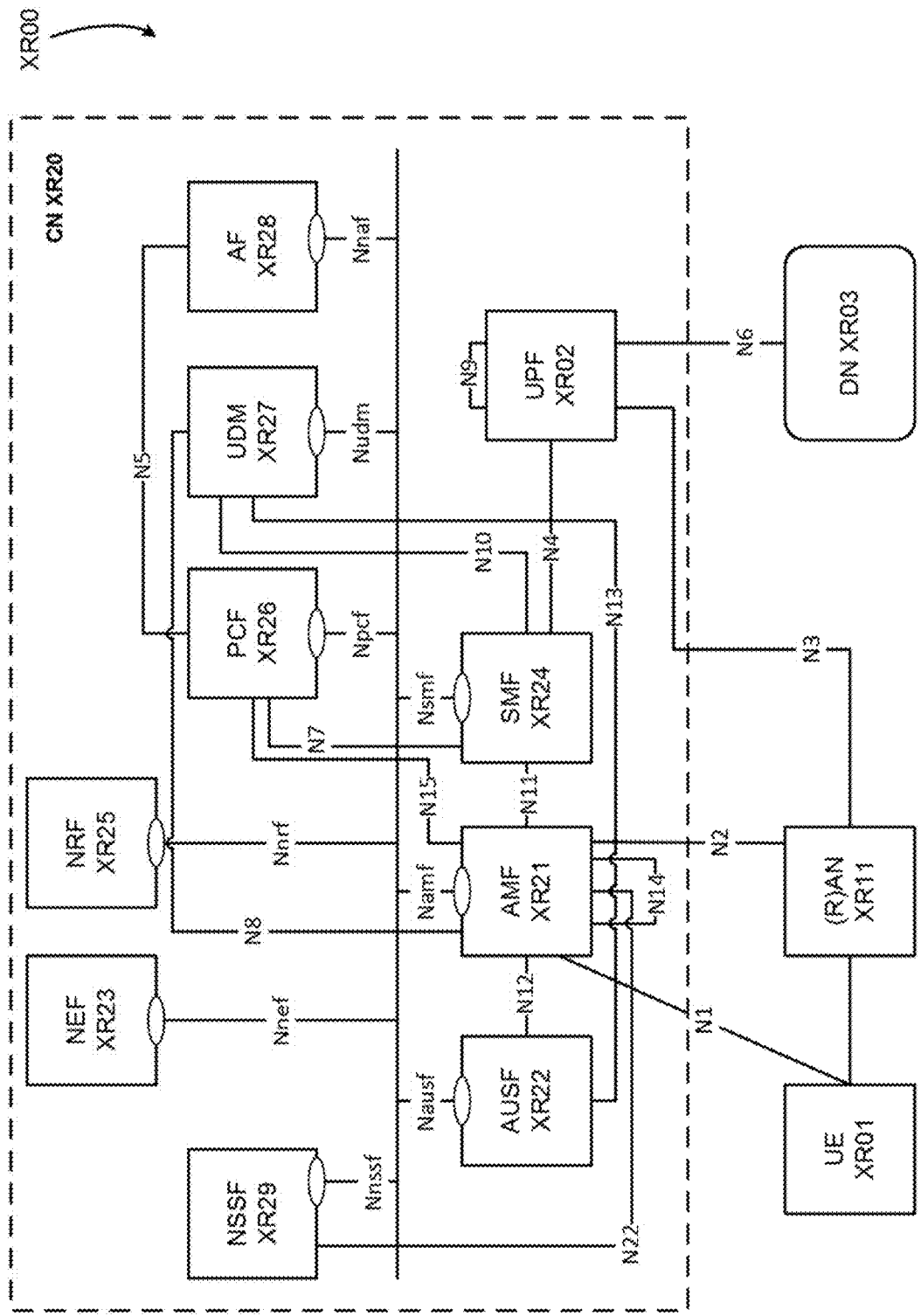
FIG. 7 depicts an architecture of a system of a network in accordance with some embodiments.

FIG. 7 illustrates an architecture of a system XR00 of a network in accordance with some embodiments. The system XR00 is shown to include a UE XR01, which may be the same or similar to UEs XQ01 and XQ02 discussed previously; a RAN node XR11, which may be the same or similar to RAN nodes XQ11 and XQ12 discussed previously; a Data network (DN) XR03, which may be, for example, operator services, Internet access or 3rd party services; and a 5G Core Network (5GC or CN) XR20.

The CN XR20 may include an Authentication Server Function (AUSF) XR22; an Access and Mobility Management Function (AMF) XR21; a Session Management Function (SMF) XR24; a Network Exposure Function (NEF) XR23; a Policy Control function (PCF) XR26; a Network Function (NF) Repository Function (NRF) XR25; a Unified Data Management (UDM) XR27; an Application Function (AF) XR28; a User Plane Function (UPF) XR02; and a Network Slice Selection Function (NSSF) XR29.

The UPF XR02 may act as an anchor point for intra-RAT and inter-RAT mobility, an external PDU session point of interconnect to DN XR03, and a branching point to support multi-homed PDU session. The UPF XR02 may also perform packet routing and forwarding, packet inspection, enforce user plane part of policy rules, lawfully intercept packets (UP collection); traffic usage reporting, perform QoS handling for user plane (e.g., packet filtering, gating, UL/DL rate enforcement), perform Uplink Traffic verification (e.g., SDF to QoS flow mapping), transport level packet marking in the uplink and downlink, and downlink packet buffering and downlink data notification triggering. UPF XR02 may include an uplink classifier to support routing traffic flows to a data network. The DN XR03 may represent various network operator services, Internet access, or third party services. NY XR03 may include, or be similar to application server XQ30 discussed previously. The UPF XR02 may interact with the SMF XR24 via an N4 reference point between the SMF XR24 and the UPF XR02.

The AUSF XR22 may store data for authentication of UE XR01 and handle authentication related functionality. The AUSF XR22 may facilitate a common authentication framework for various access types. The AUSF XR22 may communicate with the AMF XR21 via an N12 reference point between the AMF XR21 and the AUSF XR22; and may communicate with the UDM XR27 via an N13 reference point between the UDM XR27 and the AUSF XR22. Additionally, the AUSF XR22 may exhibit an Nausf service-based interface.

The AMF XR21 may be responsible for registration management (e.g., for registering UE XR01, etc.), connection management, reachability management, mobility management, and lawful interception of AMF-related events, and access authentication and authorization. The AMF XR21 may be a termination point for the an N11 reference point between the AMF XR21 and the SMF XR24. The AMF XR21 may provide transport for Session Management (SM) messages between the UE XR01 and the SMF XR24, and act as a transparent proxy for routing SM messages. AMF XR21 may also provide transport for short message service (SMS) messages between UE XR01 and an SMS function (SMSF) (not shown by FIG. 7). AMF XR21 may act as Security Anchor Function (SEA), which may include interaction with the AUSF XR22 and the UE XR01, receipt of an intermediate key that was established as a result of the UE XR01 authentication process. Where USIM based authentication is used, the AMF XR21 may retrieve the security material from the AUSF XR22. AMF XR21 may also include a Security Context Management (SCM) function, which receives a key from the SEA that it uses to derive access-network specific keys. Furthermore, AMF XR21 may be a termination point of RAN CP interface, which may include or be an N2 reference point between the (R)AN XR11 and the AMF XR21; and the AMF XR21 may be a termination point of NAS (N1) signalling, and perform NAS ciphering and integrity protection.

AMF XR21 may also support NAS signalling with a UE XR01 over an N3 interworking-function (IWF) interface. The N3IWF may be used to provide access to untrusted entities. N3IWF may be a termination point for the N2 interface between the (R)AN XR11 and the AMF XR21 for the control plane, and may be a termination point for the N3 reference point between the (R)AN XR11 and the UPF XR02 for the user plane. As such, the AMF XR21 may handle N2 signalling from the SMF XR24 and the AMF XR21 for PDU sessions and QoS, encapsulate/de-encapsulate packets for IPSec and N3 tunnelling, mark N3 user-plane packets in the uplink, and enforce QoS corresponding to N3 packet marking taking into account QoS requirements associated to such marking received over N2. N3IWF may also relay uplink and downlink control-plane NAS signalling between the UE XR01 and AMF XR21 via an N1 reference point between the UE XR01 and the AMF XR21, and relay uplink and downlink user-plane packets between the UE XR01 and UPF XR02. The N3IWF also provides mechanisms for IPsec tunnel establishment with the UE XR01. The AMF XR21 may exhibit an Namf service-based interface, and may be a termination point for an N14 reference point between two AMFs XR21 and an N17 reference point between the AMF XR21 and a 5G-Equipment Identity Register (5G-EIR) (not shown by FIG. 7).

The SMF XR24 may be responsible for session management (e.g., session establishment, modify and release, including tunnel maintain between UPF and AN node); UE IP address allocation & management (including optional Authorization); Selection and control of UP function; Configures traffic steering at UPF to route traffic to proper destination; termination of interfaces towards Policy control functions; control part of policy enforcement and QoS; lawful intercept (for SM events and interface to LI System); termination of SM parts of NAS messages; downlink Data Notification; initiator of AN specific SM information, sent via AMF over N2 to AN; determine SSC mode of a session. The SMF XR24 may include the following roaming functionality: handle local enforcement to apply QoS SLAB (VPLMN); charging data collection and charging interface (VPLMN); lawful intercept (in VPLMN for SM events and interface to LI System); support for interaction with external DN for transport of signalling for PDU session authorization/authentication by external DN. An N16 reference point between two SMFs XR24 may be included in the system XR00, which may be between another SMF XR24 in a visited network and the SMF XR24 in the home network in roaming scenarios. Additionally, the SMF XR24 may exhibit the Nsmf service-based interface.

The NEF XR23 may provide means for securely exposing the services and capabilities provided by 3GPP network functions for third party, internal exposure/re-exposure, Application Functions (e.g., AF XR28), edge computing or fog computing systems, etc. In such embodiments, the NEF XR23 may authenticate, authorize, and/or throttle the AFs. NEF XR23 may also translate information exchanged with the AF XR28 and information exchanged with internal network functions. For example, the NEF XR23 may translate between an AF-Service-Identifier and an internal 5GC information. NEF XR23 may also receive information from other network functions (NFs) based on exposed capabilities of other network functions. This information may be stored at the NEF XR23 as structured data, or at a data storage NF using a standardized interfaces. The stored information can then be re-exposed by the NEF XR23 to other NFs and AFs, and/or used for other purposes such as analytics. Additionally, the NEF XR23 may exhibit an Nnef service-based interface.

The NRF XR25 may support service discovery functions, receive NF Discovery Requests from NF instances, and provide the information of the discovered NF instances to the NF instances. NRF XR25 also maintains information of available NF instances and their supported services. As used herein, the terms "instantiate", "instantiation", and the like may refer to the creation of an instance, and an "instance" may refer to a concrete occurrence of an object, which may occur, for example, during execution of program code. Additionally, the NRF XR25 may exhibit the Nnrf service-based interface.

The PCF XR26 may provide policy rules to control plane function(s) to enforce them, and may also support unified policy framework to govern network behaviour. The PCF XR26 may also implement a front end (FE) to access subscription information relevant for policy decisions in a UDR of the UDM XR27. The PCF XR26 may communicate with the AMF XR21 via an N15 reference point between the PCF XR26 and the AMF XR21, which may include a PCF XR26 in a visited network and the AMF XR21 in case of roaming scenarios. The PCF XR26 may communicate with the AF XR28 via an N5 reference point between the PCF XR26 and the AF XR28; and with the SMF XR24 via an N7 reference point between the PCF XR26 and the SMF XR24. The system XR00 and/or CN XR20 may also include an N24 reference point between the PCF XR26 (in the home network) and a PCF XR26 in a visited network. Additionally, the PCF XR26 may exhibit an Npcf service-based interface.

The UDM XR27 may handle subscription-related information to support the network entities' handling of communication sessions, and may store subscription data of UE XR01. For example, subscription data may be communicated between the UDM XR27 and the AMF XR21 via an N8 reference point between the UDM XR27 and the AMF XR21 (not shown by FIG. 7). The UDM XR27 may include two parts, an application FE and a User Data Repository (UDR) (the FE and UDR are not shown by FIG. 7). The UDR may store subscription data and policy data for the UDM XR27 and the PCF XR26, and/or structured data for exposure and application data (including Packet Flow Descriptions (PFDs) for application detection, application request information for multiple UEs XR01) for the NEF XR23. The Nudr service-based interface may be exhibited by the UDR XR21 to allow the UDM XR27, PCF XR26, and NEF XR23 to access a particular set of the stored data, as well as to read, update (e.g., add, modify), delete, and subscribe to notification of relevant data changes in the UDR. The UDM may include a UDM FE, which is in charge of processing of credentials, location management, subscription management and so on. Several different front ends may serve the same user in different transactions. The UDM-FE accesses subscription information stored in the UDR and performs authentication credential processing; user identification handling; access authorization; registration/mobility management; and subscription management. The UDR may interact with the SMF XR24 via an N10 reference point between the UDM XR27 and the SMF XR24. UDM XR27 may also support SMS management, wherein an SMS-FE implements the similar application logic as discussed previously. Additionally, the UDM XR27 may exhibit the Nudm service-based interface.

The AF XR28 may provide application influence on traffic routing, access to the Network Capability Exposure (NCE), and interact with the policy framework for policy control. The NCE may be a mechanism that allows the 5GC and AF XR28 to provide information to each other via NEF XR23, which may be used for edge computing implementations. In such implementations, the network operator and third party services may be hosted close to the UE XR01 access point of attachment to achieve an efficient service delivery through the reduced end-to-end latency and load on the transport network. For edge computing implementations, the 5GC may select a UPF XR02 close to the UE XR01 and execute traffic steering from the UPF XR02 to DN XR03 via the N6 interface. This may be based on the UE subscription data, UE location, and information provided by the AF XR28. In this way, the AF XR28 may influence UPF (re)selection and traffic routing. Based on operator deployment, when AF XR28 is considered to be a trusted entity, the network operator may permit AF XR28 to interact directly with relevant NFs. Additionally, the AF XR28 may exhibit an Naf service-based interface.

The NSSF XR29 may select a set of network slice instances serving the UE XR01. The NSSF XR29 may also determine allowed Network Slice Selection Assistance Information (NSSAI) and the mapping to the Subscribed Single-NSSAIs (S-NSSAIs), if needed. The NSSF XR29 may also determine the AMF set to be used to serve the UE XR01, or a list of candidate AMF(s) XR21 based on a suitable configuration and possibly by querying the NRF XR25. The selection of a set of network slice instances for the UE XR01 may be triggered by the AMF XR21 with which the UE XR01 is registered by interacting with the NSSF XR29, which may lead to a change of AMF XR21. The NSSF XR29 may interact with the AMF XR21 via an N22 reference point between AMF XR21 and NSSF XR29; and may communicate with another NSSF XR29 in a visited network via an N31 reference point (not shown by FIG. 7). Additionally, the NSSF XR29 may exhibit an Nnssf service-based interface.

As discussed previously, the CN XR20 may include an SMSF, which may be responsible for SMS subscription checking and verification, and relaying SM messages to/from the UE XR01 to/from other entities, such as an SMS-GMSC/IWMSC/SMS-router. The SMS may also interact with AMF XR21 and UDM XR27 for notification procedure that the UE XR01 is available for SMS transfer (e.g., set a UE not reachable flag, and notifying UDM XR27 when UE XR01 is available for SMS).

The CN XR20 may also include other elements that are not shown by FIG. 7, such as a Data Storage system/architecture, a 5G-Equipment Identity Register (5G-EIR), a Security Edge Protection Proxy (SEPP), and the like. The Data Storage system may include a Structured Data Storage network function (SDSF), an Unstructured Data Storage network function (UDSF), and/or the like. Any NF may store and retrieve unstructured data into/from the UDSF (e.g., UE contexts), via N18 reference point between any NF and the UDSF (not shown by FIG. 7). Individual NFs may share a UDSF for storing their respective unstructured data or individual NFs may each have their own UDSF located at or near the individual NFs. Additionally, the UDSF may exhibit an Nudsf service-based interface (not shown by FIG. 7). The 5G-EIR may be an NF that checks the status of Permanent Equipment Identifiers (PEI) for determining whether particular equipment/entities are blacklisted from the network; and the SEPP may be a non-transparent proxy that performs topology hiding, message filtering, and policing on inter-PLMN control plane interfaces.

Additionally, there may be many more reference points and/or service-based interfaces between the NF services in the NFs; however, these interfaces and reference points have been omitted from FIG. 7 for clarity. In one example, the CN XR20 may include an Nx interface, which is an inter-CN interface between the MME (e.g., MME XQ21) and the AMF XR21 in order to enable interworking between CN XR20 and CN XQ20. Other example interfaces/reference points may include an N5g-eir service-based interface exhibited by a 5G-EIR, an N27 reference point between NRF in the visited network and the NRF in the home network; and an N31 reference point between the NSSF in the visited network and the NSSF in the home network.

In yet another example, system XR00 may include multiple RAN nodes XR11 wherein an Xn interface is defined between two or more RAN nodes XR11 (e.g., gNBs and the like) that connecting to 5GC XR20, between a RAN node XR11 (e.g., gNB) connecting to 5GC XR20 and an eNB (e.g., a RAN node XQ11 of FIG. 6), and/or between two eNBs connecting to 5GC XR20. In some implementations, the Xn interface may include an Xn user plane (Xn-U) interface and an Xn control plane (Xn-C) interface. The Xn-U may provide non-guaranteed delivery of user plane PDUs and support/provide data forwarding and flow control functionality. The Xn-C may provide management and error handling functionality, functionality to manage the Xn-C interface; mobility support for UE XR01 in a connected mode (e.g., CM-CONNECTED) including functionality to manage the UE mobility for connected mode between one or more RAN nodes XR11. The mobility support may include context transfer from an old (source) serving RAN node XR11 to new (target) serving RAN node XR11; and control of user plane tunnels between old (source) serving RAN node XR11 to new (target) serving RAN node XR11. A protocol stack of the Xn-U may include a transport network layer built on Internet Protocol (IP) transport layer, and a GTP-U layer on top of a UDP and/or IP layer(s) to carry user plane PDUs. The Xn-C protocol stack may include an application layer signaling protocol (referred to as Xn Application Protocol (Xn-AP)) and a transport network layer that is built on an SCTP layer. The SCTP layer may be on top of an IP layer. The SCTP layer provides the guaranteed delivery of application layer messages. In the transport IP layer point-to-point transmission is used to deliver the signaling PDUs. In other implementations, the Xn-U protocol stack and/or the Xn-C protocol stack may be same or similar to the user plane and/or control plane protocol stack(s) shown and described herein.

Figure 8:
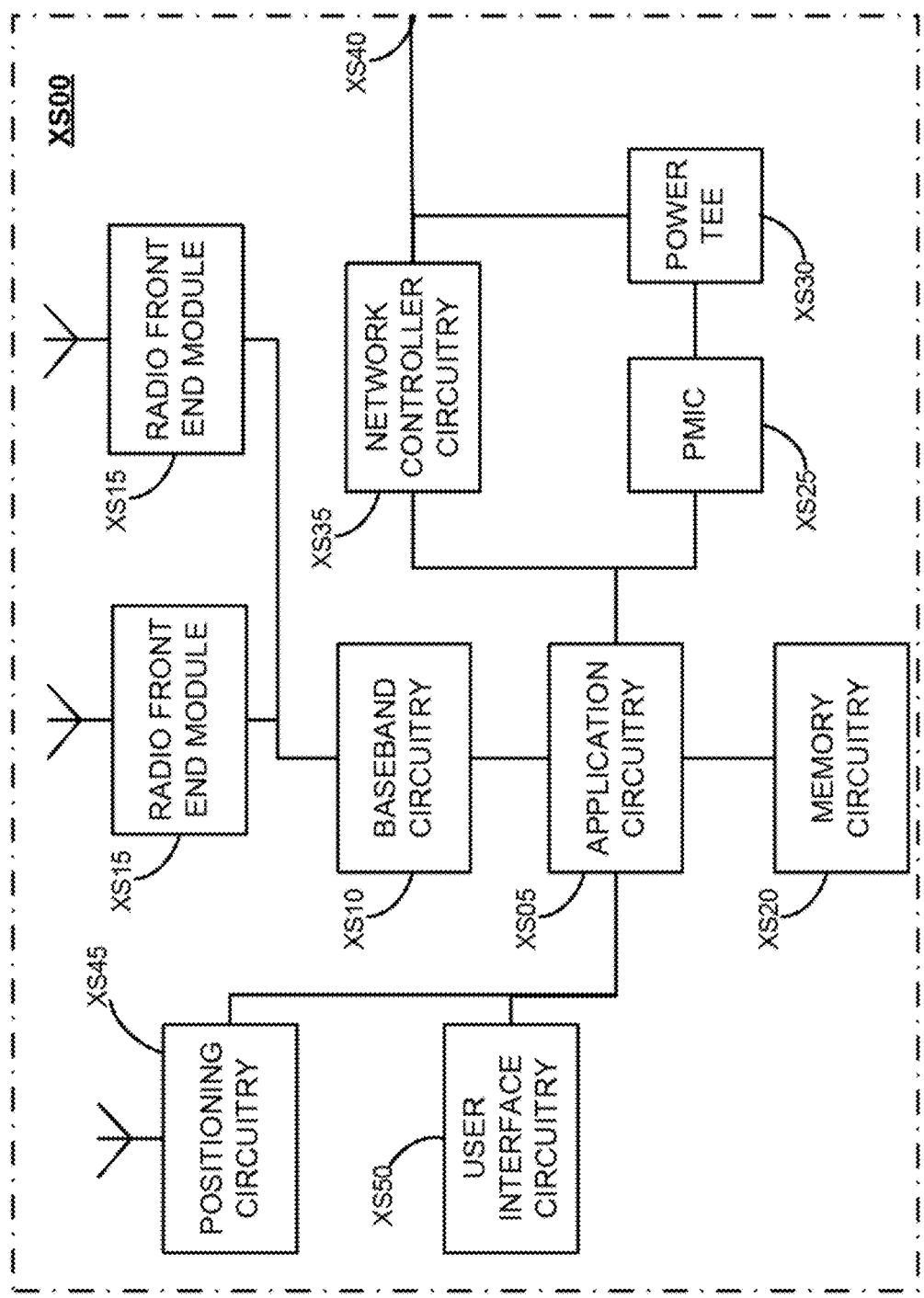
FIG. 8 depicts an example of infrastructure equipment in accordance with some embodiments.

FIG. 8 illustrates an example of infrastructure equipment XS00 in accordance with various embodiments. The infrastructure equipment XS00 (or "system XS00") may be implemented as a base station, radio head, RAN node, etc., such as the RAN nodes XQ11 and XQ12, and/or AP XQ06 shown and described previously. In other examples, the system XS00 could be implemented in or by a UE, application server(s) XQ30, and/or any other element/device discussed herein. The system XS00 may include one or more of application circuitry XS05, baseband circuitry XS10, one or more radio front end modules XS15, memory XS20, power management integrated circuitry (PMIC) XS25, power tee circuitry XS30, network controller XS35, network interface connector XS40, satellite positioning circuitry XS45, and user interface XS50. In some embodiments, the device XT00 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

As used herein, the term "circuitry" may refer to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD), (for example, a field-programmable gate array (FPGA), a programmable logic device (PLD), a complex PLD (CPLD), a high-capacity PLD (HCPLD), a structured ASIC, or a programmable System on Chip (SoC)), digital signal processors (DSPs), etc., that are configured to provide the described functionality. In some embodiments, the circuitry may execute one or more software or firmware programs to provide at least some of the described functionality. In addition, the term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The terms "application circuitry" and/or "baseband circuitry" may be considered synonymous to, and may be referred to as "processor circuitry." As used herein, the term "processor circuitry" may refer to, is part of, or includes circuitry capable of sequentially and automatically carrying out a sequence of arithmetic or logical operations; recording, storing, and/or transferring digital data. The term "processor circuitry" may refer to one or more application processors, one or more baseband processors, a physical central processing unit (CPU), a single-core processor, a dual-core processor, a triple-core processor, a quad-core processor, and/or any other device capable of executing or otherwise operating computer-executable instructions, such as program code, software modules, and/or functional processes.

Furthermore, the various components of the core network XQ20 (or CN XR20 discussed infra) may be referred to as "network elements." The term "network element" may describe a physical or virtualized equipment used to provide wired or wireless communication network services. The term "network element" may be considered synonymous to and/or referred to as a networked computer, networking hardware, network equipment, network node, router, switch, hub, bridge, radio network controller, radio access network device, gateway, server, virtualized network function (VNF), network functions virtualization infrastructure (NFVI), and/or the like.

Application circuitry XS05 may include one or more central processing unit (CPU) cores and one or more of cache memory, low drop-out voltage regulators (LDOs), interrupt controllers, serial interfaces such as SPI, I2C or universal programmable serial interface module, real time clock (RTC), timer-counters including interval and watchdog timers, general purpose input/output (I/O or IO), memory card controllers such as Secure Digital (SD/)MultiMediaCard (MMC) or similar, Universal Serial Bus (USB) interfaces, Mobile Industry Processor Interface (MIPI) interfaces and Joint Test Access Group (JTAG) test access ports. As examples, the application circuitry XS05 may include one or more Intel Pentium®, Core®, or Xeon® processor(s); Advanced Micro Devices (AMD) Ryzen® processor(s), Accelerated Processing Units (APUs), or Epyc® processors; and/or the like. In some embodiments, the system XS00 may not utilize application circuitry XS05, and instead may include a special-purpose processor/controller to process IP data received from an EPC or 5GC, for example.

Additionally or alternatively, application circuitry XS05 may include circuitry such as, but not limited to, one or more a field-programmable devices (FPDs) such as field-programmable gate arrays (FPGAs) and the like; programmable logic devices (PLDs) such as complex PLDs (CPLDs), high-capacity PLDs (HCPLDs), and the like; ASICs such as structured ASICs and the like; programmable SoCs (PSoCs); and the like. In such embodiments, the circuitry of application circuitry XS05 may comprise logic blocks or logic fabric including and other interconnected resources that may be programmed to perform various functions, such as the procedures, methods, functions, etc. of the various embodiments discussed herein. In such embodiments, the circuitry of application circuitry XS05 may include memory cells (e.g., erasable programmable read-only memory (EPROM), electrically erasable programmable read-only memory (EEPROM), flash memory, static memory (e.g., static random access memory (SRAM), anti-fuses, etc.) used to store logic blocks, logic fabric, data, etc. in lookup-tables (LUTs) and the like.

The baseband circuitry XS10 may be implemented, for example, as a solder-down substrate including one or more integrated circuits, a single packaged integrated circuit soldered to a main circuit board or a multi-chip module containing two or more integrated circuits. Although not shown, baseband circuitry XS10 may comprise one or more digital baseband systems, which may be coupled via an interconnect subsystem to a CPU subsystem, an audio subsystem, and an interface subsystem. The digital baseband subsystems may also be coupled to a digital baseband interface and a mixed-signal baseband sub-system via another interconnect subsystem. Each of the interconnect subsystems may include a bus system, point-to-point connections, network-on-chip (NOC) structures, and/or some other suitable bus or interconnect technology, such as those discussed herein. The audio sub-system may include digital signal processing circuitry, buffer memory, program memory, speech processing accelerator circuitry, data converter circuitry such as analog-to-digital and digital-to-analog converter circuitry, analog circuitry including one or more of amplifiers and filters, and/or other like components. In an aspect of the present disclosure, baseband circuitry XS10 may include protocol processing circuitry with one or more instances of control circuitry (not shown) to provide control functions for the digital baseband circuitry and/or radio frequency circuitry (for example, the radio front end modules XS15).

User interface circuitry XS50 may include one or more user interfaces designed to enable user interaction with the system XS00 or peripheral component interfaces designed to enable peripheral component interaction with the system XS00. User interfaces may include, but are not limited to one or more physical or virtual buttons (e.g., a reset button), one or more indicators (e.g., light emitting diodes (LEDs)), a physical keyboard or keypad, a mouse, a touchpad, a touchscreen, speakers or other audio emitting devices, microphones, a printer, a scanner, a headset, a display screen or display device, etc. Peripheral component interfaces may include, but are not limited to, a non-volatile memory port, a universal serial bus (USB) port, an audio jack, a power supply interface, etc.

The radio front end modules (RFEMs) XS15 may comprise a millimeter wave RFEM and one or more sub-millimeter wave radio frequency integrated circuits (RFICs). In some implementations, the one or more sub-millimeter wave RFICs may be physically separated from the millimeter wave RFEM. The RFICs may include connections to one or more antennas or antenna arrays, and the RFEM may be connected to multiple antennas. In alternative implementations, both millimeter wave and sub-millimeter wave radio functions may be implemented in the same physical radio front end module XS15. The RFEMs XS15 may incorporate both millimeter wave antennas and sub-millimeter wave antennas.

The memory circuitry XS20 may include one or more of volatile memory including dynamic random access memory (DRAM) and/or synchronous dynamic random access memory (SDRAM), and nonvolatile memory (NVM) including high-speed electrically erasable memory (commonly referred to as Flash memory), phase change random access memory (PRAM), magnetoresistive random access memory (MRAM), etc., and may incorporate the three-dimensional (3D) cross-point (XPOINT) memories from Intel® and Micron®. Memory circuitry XS20 may be implemented as one or more of solder down packaged integrated circuits, socketed memory modules and plug-in memory cards.

The PMIC XS25 may include voltage regulators, surge protectors, power alarm detection circuitry, and one or more backup power sources such as a battery or capacitor. The power alarm detection circuitry may detect one or more of brown out (under-voltage) and surge (over-voltage) conditions. The power tee circuitry XS30 may provide for electrical power drawn from a network cable to provide both power supply and data connectivity to the infrastructure equipment XS00 using a single cable.

The network controller circuitry XS35 may provide connectivity to a network using a standard network interface protocol such as Ethernet, Ethernet over GRE Tunnels, Ethernet over Multiprotocol Label Switching (MPLS), or some other suitable protocol. Network connectivity may be provided to/from the infrastructure equipment XS00 via network interface connector XS40 using a physical connection, which may be electrical (commonly referred to as a "copper interconnect"), optical, or wireless. The network controller circuitry XS35 may include one or more dedicated processors and/or FPGAs to communicate using one or more of the aforementioned protocol. In some implementations, the network controller circuitry XS35 may include multiple controllers to provide connectivity to other networks using the same or different protocols.

The positioning circuitry XS45, which may include circuitry to receive and decode signals transmitted by one or more navigation satellite constellations of a global navigation satellite system (GNSS). Examples of navigation satellite constellations (or GNSS) may include United States' Global Positioning System (GPS), Russia's Global Navigation System (GLONASS), the European Union's Galileo system, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radio-positioning Integrated by Satellite (DORIS), etc.), or the like. The positioning circuitry XS45 may comprise various hardware elements (e.g., including hardware devices such as switches, filters, amplifiers, antenna elements, and the like to facilitate the communications over-the-air (OTA) communications) to communicate with components of a positioning network, such as navigation satellite constellation nodes.

Nodes or satellites of the navigation satellite constellation(s) ("GNSS nodes") may provide positioning services by continuously transmitting or broadcasting GNSS signals along a line of sight, which may be used by GNSS receivers (e.g., positioning circuitry XS45 and/or positioning circuitry implemented by UEs XQ01, XQ02, or the like) to determine their GNSS position. The GNSS signals may include a pseudorandom code (e.g., a sequence of ones and zeros) that is known to the GNSS receiver and a message that includes a time of transmission (ToT) of a code epoch (e.g., a defined point in the pseudorandom code sequence) and the GNSS node position at the ToT. The GNSS receivers may monitor/measure the GNSS signals transmitted/broadcasted by a plurality of GNSS nodes (e.g., four or more satellites) and solve various equations to determine a corresponding GNSS position (e.g., a spatial coordinate). The GNSS receivers also implement clocks that are typically less stable and less precise than the atomic clocks of the GNSS nodes, and the GNSS receivers may use the measured GNSS signals to determine the GNSS receivers' deviation from true time (e.g., an offset of the GNSS receiver clock relative to the GNSS node time). In some embodiments, the positioning circuitry XS45 may include a Micro-Technology for Positioning, Navigation, and Timing (Micro-PNT) IC that uses a master timing clock to perform position tracking/estimation without GNSS assistance.

The GNSS receivers may measure the time of arrivals (ToAs) of the GNSS signals from the plurality of GNSS nodes according to its own clock. The GNSS receivers may determine ToF values for each received GNSS signal from the ToAs and the ToTs, and then may determine, from the ToFs, a three-dimensional (3D) position and clock deviation. The 3D position may then be converted into a latitude, longitude and altitude. The positioning circuitry XS45 may provide data to application circuitry XS05 which may include one or more of position data or time data. Application circuitry XS05 may use the time data to synchronize operations with other radio base stations (e.g., RAN nodes XQ11, XQ12, XR11 or the like).

The components shown by FIG. 8 may communicate with one another using interface circuitry. As used herein, the term "interface circuitry" may refer to, is part of, or includes circuitry providing for the exchange of information between two or more components or devices. The term "interface circuitry" may refer to one or more hardware interfaces, for example, buses, input/output (I/O) interfaces, peripheral component interfaces, network interface cards, and/or the like. Any suitable bus technology may be used in various implementations, which may include any number of technologies, including industry standard architecture (ISA), extended ISA (EISA), peripheral component interconnect (PCI), peripheral component interconnect extended (PCIx), PCI express (PCIe), or any number of other technologies. The bus may be a proprietary bus, for example, used in a SoC based system. Other bus systems may be included, such as an I2C interface, an SPI interface, point to point interfaces, and a power bus, among others.

Figure 9:
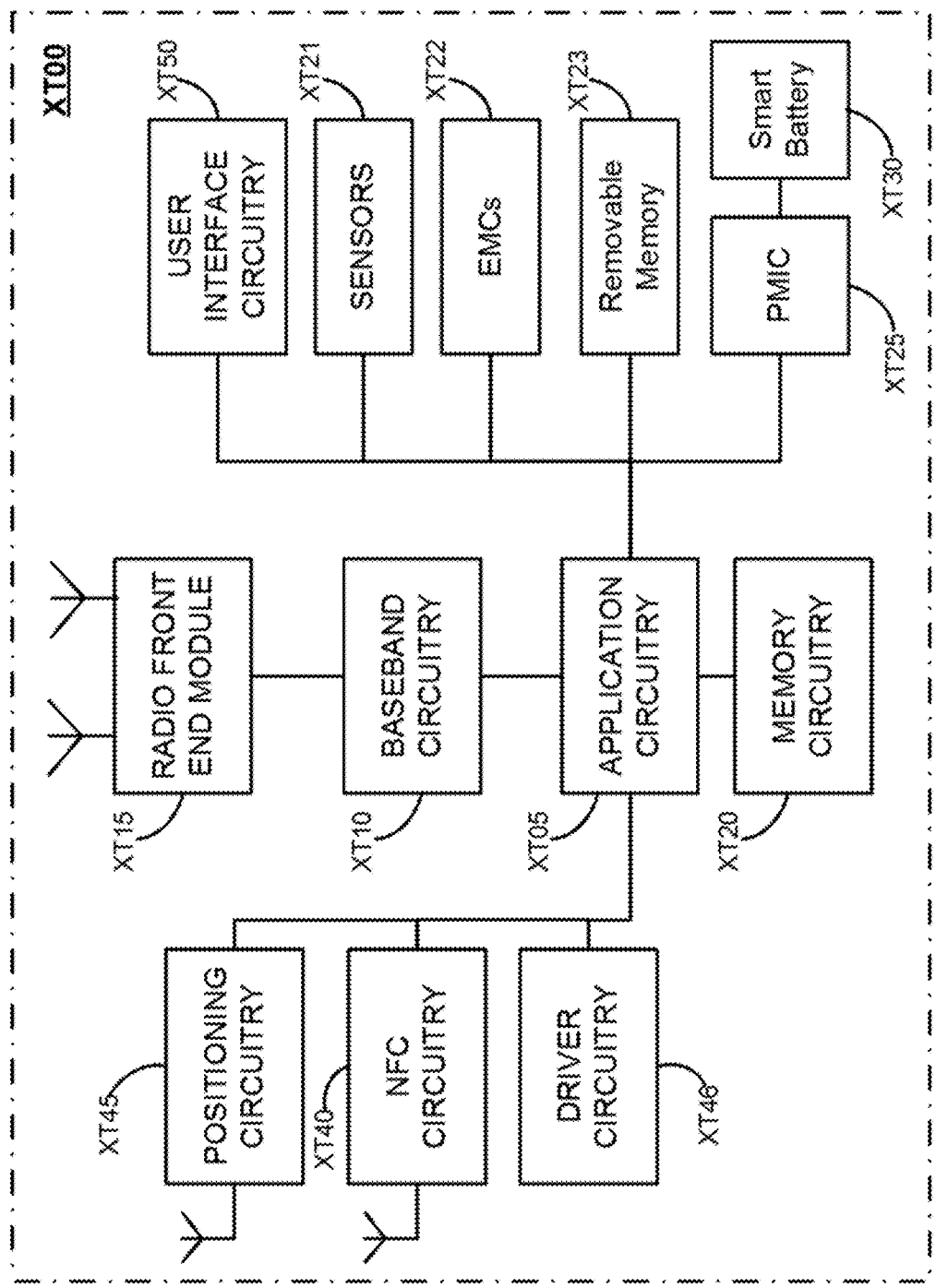
FIG. 9 depicts example components of a computer platform in accordance with some embodiments.

FIG. 9 illustrates an example of a platform XT00 (or "device XT00") in accordance with various embodiments. In embodiments, the computer platform XT00 may be suitable for use as UEs XQ01, XQ02, XR01, application servers XQ30, and/or any other element/device discussed herein. The platform XT00 may include any combinations of the components shown in the example. The components of platform XT00 may be implemented as integrated circuits (ICs), portions thereof, discrete electronic devices, or other modules, logic, hardware, software, firmware, or a combination thereof adapted in the computer platform XT00, or as components otherwise incorporated within a chassis of a larger system. The block diagram of FIG. 9 is intended to show a high level view of components of the computer platform XT00. However, some of the components shown may be omitted, additional components may be present, and different arrangement of the components shown may occur in other implementations.

The application circuitry XT05 may include circuitry such as, but not limited to single-core or multi-core processors and one or more of cache memory, low drop-out voltage regulators (LDOs), interrupt controllers, serial interfaces such as serial peripheral interface (SPI), inter-integrated circuit (I2C) or universal programmable serial interface circuit, real time clock (RTC), timer-counters including interval and watchdog timers, general purpose input-output (TO), memory card controllers such as secure digital/multimedia card (SD/MMC) or similar, universal serial bus (USB) interfaces, mobile industry processor interface (MIPI) interfaces and Joint Test Access Group (JTAG) test access ports. The processor(s) may include any combination of general-purpose processors and/or dedicated processors (e.g., graphics processors, application processors, etc.). The processors (or cores) may be coupled with or may include memory/storage and may be configured to execute instructions stored in the memory/storage to enable various applications or operating systems to run on the platform XT00. In some embodiments, processors of application circuitry XS05/XT05 may process IP data packets received from an EPC or SGC.

Application circuitry XT05 be or include a microprocessor, a multi-core processor, a multithreaded processor, an ultra-low voltage processor, an embedded processor, or other known processing element. In one example, the application circuitry XT05 may include an Intel® Architecture Core™ based processor, such as a Quark™, an Atom™, an i3, an i5, an i7, or an MCU-class processor, or another such processor available from Intel® Corporation, Santa Clara, Calif. The processors of the application circuitry XT05 may also be one or more of Advanced Micro Devices (AMD) Ryzen® processor(s) or Accelerated Processing Units (APUs); A5-A9 processor(s) from Apple® Inc., Snapdragon™ processor(s) from Qualcomm® Technologies, Inc., Texas Instruments, Inc.® Open Multimedia Applications Platform (OMAP)™ processor(s); a MIPS-based design from MIPS Technologies, Inc; an ARM-based design licensed from ARM Holdings, Ltd.; or the like. In some implementations, the application circuitry XT05 may be a part of a system on a chip (SoC) in which the application circuitry XT05 and other components are formed into a single integrated circuit, or a single package, such as the Edison™ or Galileo™ SoC boards from Intel® Corporation.

Additionally or alternatively, application circuitry XT05 may include circuitry such as, but not limited to, one or more a field-programmable devices (FPDs) such as FPGAs and the like; programmable logic devices (PLDs) such as complex PLDs (CPLDs), high-capacity PLDs (HCPLDs), and the like; ASICs such as structured ASICs and the like; programmable SoCs (PSoCs); and the like. In such embodiments, the circuitry of application circuitry XT05 may comprise logic blocks or logic fabric including and other interconnected resources that may be programmed to perform various functions, such as the procedures, methods, functions, etc. of the various embodiments discussed herein. In such embodiments, the circuitry of application circuitry XT05 may include memory cells (e.g., erasable programmable read-only memory (EPROM), electrically erasable programmable read-only memory (EEPROM), flash memory, static memory (e.g., static random access memory (SRAM), anti-fuses, etc.) used to store logic blocks, logic fabric, data, etc. in lookup-tables (LUTs) and the like.

The baseband circuitry XT10 may be implemented, for example, as a solder-down substrate including one or more integrated circuits, a single packaged integrated circuit soldered to a main circuit board or a multi-chip module containing two or more integrated circuits. Although not shown, baseband circuitry XT10 may comprise one or more digital baseband systems, which may be coupled via an interconnect subsystem to a CPU subsystem, an audio subsystem, and an interface subsystem. The digital baseband subsystems may also be coupled to a digital baseband interface and a mixed-signal baseband sub-system via another interconnect subsystem. Each of the interconnect subsystems may include a bus system, point-to-point connections, network-on-chip (NOC) structures, and/or some other suitable bus or interconnect technology, such as those discussed herein. The audio sub-system may include digital signal processing circuitry, buffer memory, program memory, speech processing accelerator circuitry, data converter circuitry such as analog-to-digital and digital-to-analog converter circuitry, analog circuitry including one or more of amplifiers and filters, and/or other like components. In an aspect of the present disclosure, baseband circuitry XT10 may include protocol processing circuitry with one or more instances of control circuitry (not shown) to provide control functions for the digital baseband circuitry and/or radio frequency circuitry (for example, the radio front end modules XT15).

The radio front end modules (RFEMs) XT15 may comprise a millimeter wave RFEM and one or more sub-millimeter wave radio frequency integrated circuits (RFICs). In some implementations, the one or more sub-millimeter wave RFICs may be physically separated from the millimeter wave RFEM. The RFICs may include connections to one or more antennas or antenna arrays, and the RFEM may be connected to multiple antennas. In alternative implementations, both millimeter wave and sub-millimeter wave radio functions may be implemented in the same physical radio front end module XT15. The RFEMs XT15 may incorporate both millimeter wave antennas and sub-millimeter wave antennas.

The memory circuitry XT20 may include any number and type of memory devices used to provide for a given amount of system memory. As examples, the memory circuitry XT20 may include one or more of volatile memory including be random access memory (RAM), dynamic RAM (DRAM) and/or synchronous dynamic RAM (SDRAM), and nonvolatile memory (NVM) including high-speed electrically erasable memory (commonly referred to as Flash memory), phase change random access memory (PRAM), magnetoresistive random access memory (MRAM), etc. The memory circuitry XT20 may be developed in accordance with a Joint Electron Devices Engineering Council (JEDEC) low power double data rate (LPDDR)-based design, such as LPDDR2, LPDDR3, LPDDR4, or the like. Memory circuitry XS20 may be implemented as one or more of solder down packaged integrated circuits, single die package (SDP), dual die package (DDP) or quad die package (Q17P), socketed memory modules, dual inline memory modules (DIMMs) including microDIMMs or MiniDIMMs, and/or soldered onto a motherboard via a ball grid array (BGA). In low power implementations, the memory circuitry XT20 may be on-die memory or registers associated with the application circuitry XT05. To provide for persistent storage of information such as data, applications, operating systems and so forth, memory circuitry XT20 may include one or more mass storage devices, which may include, inter alia, a solid state disk drive (SSDD), hard disk drive (HDD), a micro HDD, resistance change memories, phase change memories, holographic memories, or chemical memories, among others. For example, the computer platform XT00 may incorporate the three-dimensional (3D) cross-point (XPOINT) memories from Intel® and Micron®.

Removable memory circuitry XT23 may include devices, circuitry, enclosures/housings, ports or receptacles, etc. used to coupled portable data storage devices with the platform XT00. These portable data storage devices may be used for mass storage purposes, and may include, for example, flash memory cards (e.g., Secure Digital (SD) cards, microSD cards, xD picture cards, and the like), and USB flash drives, optical discs, external HDDs, and the like.

The platform XT00 may also include interface circuitry (not shown) that is used to connect external devices with the platform XT00. The external devices connected to the platform XT00 via the interface circuitry may include sensors XT21, such as accelerometers, level sensors, flow sensors, temperature sensors, pressure sensors, barometric pressure sensors, and the like. The interface circuitry may be used to connect the platform XT00 to electro-mechanical components (EMCs) XT22, which may allow platform XT00 to change its state, position, and/or orientation, or move or control a mechanism or system. The EMCs XT22 may include one or more power switches, relays including electromechanical relays (EMRs) and/or solid state relays (SSRs), actuators (e.g., valve actuators, etc.), an audible sound generator, a visual warning device, motors (e.g., DC motors, stepper motors, etc.), wheels, thrusters, propellers, claws, clamps, hooks, and/or other like electro-mechanical components. In embodiments, platform XT00 may be configured to operate one or more EMCs XT22 based on one or more captured events and/or instructions or control signals received from a service provider and/or various clients.

In some implementations, the interface circuitry may connect the platform XT00 with positioning circuitry XT45, which may be the same or similar as the positioning circuitry XT45 discussed with regard to FIG. 8.

In some implementations, the interface circuitry may connect the platform XT00 with near-field communication (NFC) circuitry XT40, which may include an NFC controller coupled with an antenna element and a processing device. The NFC circuitry XT40 may be configured to read electronic tags and/or connect with another NFC-enabled device.

The driver circuitry XT46 may include software and hardware elements that operate to control particular devices that are embedded in the platform XT00, attached to the platform XT00, or otherwise communicatively coupled with the platform XT00. The driver circuitry XT46 may include individual drivers allowing other components of the platform XT00 to interact or control various input/output (I/O) devices that may be present within, or connected to, the platform XT00. For example, driver circuitry XT46 may include a display driver to control and allow access to a display device, a touchscreen driver to control and allow access to a touchscreen interface of the platform XT00, sensor drivers to obtain sensor readings of sensors XT21 and control and allow access to sensors XT21, EMC drivers to obtain actuator positions of the EMCs XT22 and/or control and allow access to the EMCs XT22, a camera driver to control and allow access to an embedded image capture device, audio drivers to control and allow access to one or more audio devices.

The power management integrated circuitry (PMIC) XT25 (also referred to as "power management circuitry XT25") may manage power provided to various components of the platform XT00. In particular, with respect to the baseband circuitry XT10, the PMIC XT25 may control power-source selection, voltage scaling, battery charging, or DC-to-DC conversion. The PMIC XT25 may often be included when the platform XT00 is capable of being powered by a battery XT30, for example, when the device is included in a UE XQ01, XQ02, XR01.

In some embodiments, the PMIC XT25 may control, or otherwise be part of, various power saving mechanisms of the platform XT00. For example, if the platform XT00 is in an RRC_Connected state, where it is still connected to the RAN node as it expects to receive traffic shortly, then it may enter a state known as Discontinuous Reception Mode (DRX) after a period of inactivity. During this state, the platform XT00 may power down for brief intervals of time and thus save power. If there is no data traffic activity for an extended period of time, then the platform XT00 may transition off to an RRC_Idle state, where it disconnects from the network and does not perform operations such as channel quality feedback, handover, etc. The platform XT00 goes into a very low power state and it performs paging where again it periodically wakes up to listen to the network and then powers down again. The platform XT00 may not receive data in this state, in order to receive data, it must transition back to RRC_Connected state. An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

A battery XT30 may power the platform XT00, although in some examples the platform XT00 may be mounted deployed in a fixed location, and may have a power supply coupled to an electrical grid. The battery XT30 may be a lithium ion battery, a metal-air battery, such as a zinc-air battery, an aluminum-air battery, a lithium-air battery, and the like. In some implementations, such as in V2X applications, the battery XT30 may be a typical lead-acid automotive battery.

In some implementations, the battery XT30 may be a "smart battery," which includes or is coupled with a Battery Management System (BMS) or battery monitoring integrated circuitry. The BMS may be included in the platform XT00 to track the state of charge (SoCh) of the battery XT30. The BMS may be used to monitor other parameters of the battery XT30 to provide failure predictions, such as the state of health (SoH) and the state of function (SoF) of the battery XT30. The BMS may communicate the information of the battery XT30 to the application circuitry XT05 or other components of the platform XT00. The BMS may also include an analog-to-digital (ADC) convertor that allows the application circuitry XT05 to directly monitor the voltage of the battery XT30 or the current flow from the battery XT30. The battery parameters may be used to determine actions that the platform XT00 may perform, such as transmission frequency, network operation, sensing frequency, and the like.

A power block, or other power supply coupled to an electrical grid may be coupled with the BMS to charge the battery XT30. In some examples, the power block XQ28 may be replaced with a wireless power receiver to obtain the power wirelessly, for example, through a loop antenna in the computer platform XT00. In these examples, a wireless battery charging circuit may be included in the BMS. The specific charging circuits chosen may depend on the size of the battery XT30, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

Although not shown, the components of platform XT00 may communicate with one another using a suitable bus technology, which may include any number of technologies, including industry standard architecture (ISA), extended ISA (EISA), peripheral component interconnect (PCI), peripheral component interconnect extended (PCIx), PCI express (PCIe), a Time-Trigger Protocol (TTP) system, or a FlexRay system, or any number of other technologies. The bus may be a proprietary bus, for example, used in a SoC based system. Other bus systems may be included, such as an I2C interface, an SPI interface, point to point interfaces, and a power bus, among others.

Figure 10:
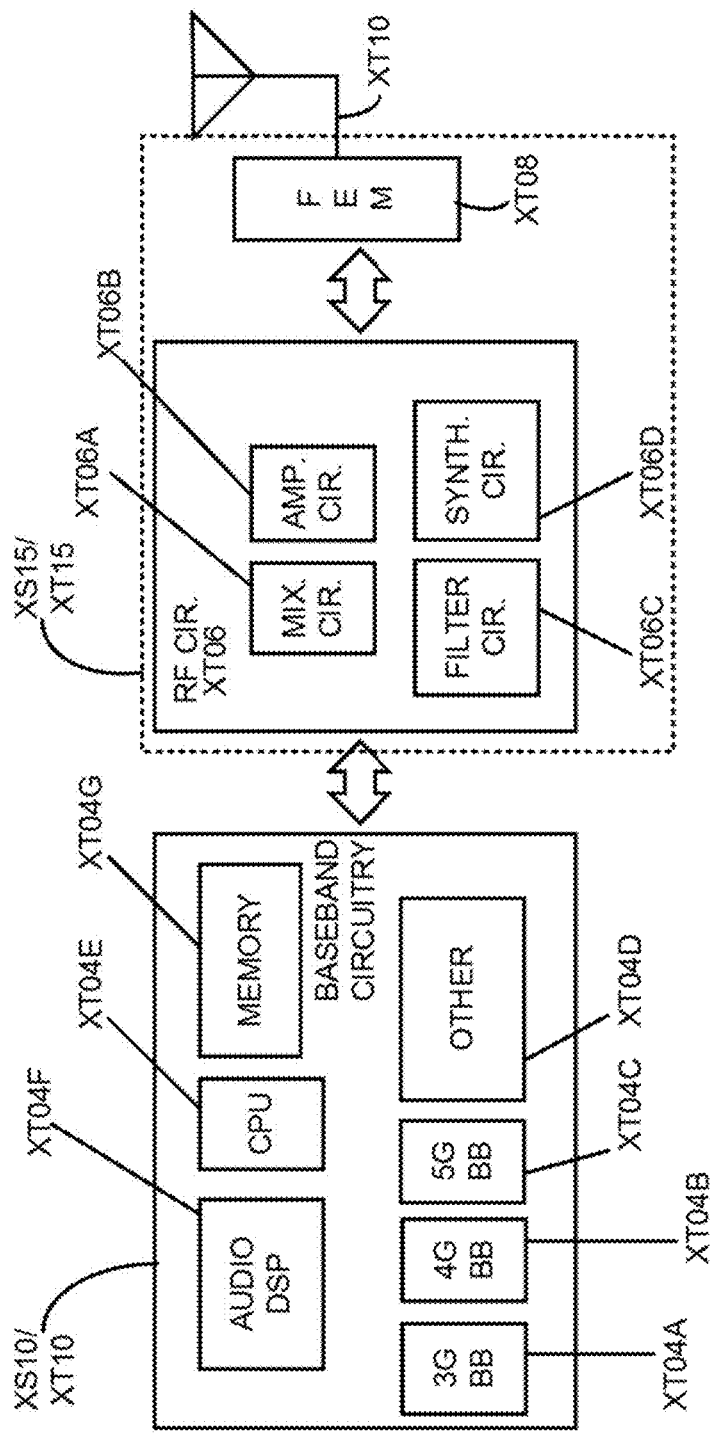
FIG. 10 depicts example components of baseband circuitry and radio frequency circuitry in accordance with some embodiments.

FIG. 10 illustrates example components of baseband circuitry XS10/XT10 and radio front end modules (RFEM) XS15/XT15 in accordance with some embodiments. As shown, the RFEM XS15/XT15 may include Radio Frequency (RF) circuitry XT06, front-end module (FEM) circuitry XT08, one or more antennas XT10 coupled together at least as shown.

The baseband circuitry XS10/XT10 may include circuitry such as, but not limited to, one or more single-core or multi-core processors. The baseband circuitry XS10/XT10 may include one or more baseband processors or control logic to process baseband signals received from a receive signal path of the RF circuitry XT06 and to generate baseband signals for a transmit signal path of the RF circuitry XT06. Baseband processing circuitry XS10/XT10 may interface with the application circuitry XS05/XT05 for generation and processing of the baseband signals and for controlling operations of the RF circuitry XT06. For example, in some embodiments, the baseband circuitry XS10/XT10 may include a third generation (3G) baseband processor XT04A, a fourth generation (4G) baseband processor XT04B, a fifth generation (5G) baseband processor XT04C, or other baseband processor(s) XT04D for other existing generations, generations in development or to be developed in the future (e.g., second generation (2G), sixth generation (6G), etc.). The baseband circuitry XS10/XT10 (e.g., one or more of baseband processors XT04A-D) may handle various radio control functions that enable communication with one or more radio networks via the RF circuitry XT06. In other embodiments, some or all of the functionality of baseband processors XT04A-D may be included in modules stored in the memory XT04G and executed via a Central Processing Unit (CPU) XT04E. The radio control functions may include, but are not limited to, signal modulation/demodulation, encoding/decoding, radio frequency shifting, etc. In some embodiments, modulation/demodulation circuitry of the baseband circuitry XS10/XT10 may include Fast-Fourier Transform (FFT), precoding, or constellation mapping/demapping functionality. In some embodiments, encoding/decoding circuitry of the baseband circuitry XS10/XT10 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry XS10/XT10 may include one or more audio digital signal processor(s) (DSP) XT04F. The audio DSP(s) XT04F may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry XS10/XT10 and the application circuitry XS05/XT05 may be implemented together such as, for example, on a system on a chip (SOC).

In some embodiments, the baseband circuitry XS10/XT10 may provide for communication compatible with one or more radio technologies. For example, in some embodiments, the baseband circuitry XS10/XT10 may support communication with an evolved universal terrestrial radio access network (EUTRAN) or other wireless metropolitan area networks (WMAN), a wireless local area network (WLAN), a wireless personal area network (WPAN). Embodiments in which the baseband circuitry XS10/XT10 is configured to support radio communications of more than one wireless protocol may be referred to as multi-mode baseband circuitry.

RF circuitry XT06 may enable communication with wireless networks using modulated electromagnetic radiation through a non-solid medium. In various embodiments, the RF circuitry XT06 may include switches, filters, amplifiers, etc. to facilitate the communication with the wireless network. RF circuitry XT06 may include a receive signal path which may include circuitry to down-convert RF signals received from the FEM circuitry XT08 and provide baseband signals to the baseband circuitry XS10/XT10. RF circuitry XT06 may also include a transmit signal path which may include circuitry to up-convert baseband signals provided by the baseband circuitry XS10/XT10 and provide RF output signals to the FEM circuitry XT08 for transmission.

In some embodiments, the receive signal path of the RF circuitry XT06 may include mixer circuitry XT06a, amplifier circuitry XT06b and filter circuitry XT06c. In some embodiments, the transmit signal path of the RF circuitry XT06 may include filter circuitry XT06c and mixer circuitry XT06a. RF circuitry XT06 may also include synthesizer circuitry XT06d for synthesizing a frequency for use by the mixer circuitry XT06a of the receive signal path and the transmit signal path. In some embodiments, the mixer circuitry XT06a of the receive signal path may be configured to down-convert RF signals received from the FEM circuitry XT08 based on the synthesized frequency provided by synthesizer circuitry XT06d. The amplifier circuitry XT06b may be configured to amplify the down-converted signals and the filter circuitry XT06c may be a low-pass filter (LPF) or band-pass filter (BPF) configured to remove unwanted signals from the down-converted signals to generate output baseband signals. Output baseband signals may be provided to the baseband circuitry XS10/XT10 for further processing. In some embodiments, the output baseband signals may be zero-frequency baseband signals, although this is not a requirement. In some embodiments, mixer circuitry XT06a of the receive signal path may comprise passive mixers, although the scope of the embodiments is not limited in this respect.

In some embodiments, the mixer circuitry XT06a of the transmit signal path may be configured to up-convert input baseband signals based on the synthesized frequency provided by the synthesizer circuitry XT06d to generate RF output signals for the FEM circuitry XT08. The baseband signals may be provided by the baseband circuitry XS10/XT10 and may be filtered by filter circuitry XT06c.

In some embodiments, the mixer circuitry XT06a of the receive signal path and the mixer circuitry XT06a of the transmit signal path may include two or more mixers and may be arranged for quadrature downconversion and upconversion, respectively. In some embodiments, the mixer circuitry XT06a of the receive signal path and the mixer circuitry XT06a of the transmit signal path may include two or more mixers and may be arranged for image rejection (e.g., Hartley image rejection). In some embodiments, the mixer circuitry XT06a of the receive signal path and the mixer circuitry XT06a may be arranged for direct downconversion and direct upconversion, respectively. In some embodiments, the mixer circuitry XT06a of the receive signal path and the mixer circuitry XT06a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry XT06 may include analog-to-digital converter (ADC) and digital-to-analog converter (DAC) circuitry and the baseband circuitry XS10/XT10 may include a digital baseband interface to communicate with the RF circuitry XT06.

In some dual-mode embodiments, a separate radio IC circuitry may be provided for processing signals for each spectrum, although the scope of the embodiments is not limited in this respect.

In some embodiments, the synthesizer circuitry XT06d may be a fractional-N synthesizer or a fractional N/N+1 synthesizer, although the scope of the embodiments is not limited in this respect as other types of frequency synthesizers may be suitable. For example, synthesizer circuitry XT06d may be a delta-sigma synthesizer, a frequency multiplier, or a synthesizer comprising a phase-locked loop with a frequency divider.

The synthesizer circuitry XT06d may be configured to synthesize an output frequency for use by the mixer circuitry XT06a of the RF circuitry XT06 based on a frequency input and a divider control input. In some embodiments, the synthesizer circuitry XT06d may be a fractional N/N+1 synthesizer.

In some embodiments, frequency input may be provided by a voltage controlled oscillator (VCO), although that is not a requirement. Divider control input may be provided by either the baseband circuitry XS10/XT10 or the applications processor XS05/XT05 depending on the desired output frequency. In some embodiments, a divider control input (e.g., N) may be determined from a look-up table based on a channel indicated by the applications processor XS05/XT05.

Synthesizer circuitry XT06d of the RF circuitry XT06 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry XT06d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry XT06 may include an IQ/polar converter.

FEM circuitry XT08 may include a receive signal path which may include circuitry configured to operate on RF signals received from one or more antennas XT10, amplify the received signals and provide the amplified versions of the received signals to the RF circuitry XT06 for further processing. FEM circuitry XT08 may also include a transmit signal path which may include circuitry configured to amplify signals for transmission provided by the RF circuitry XT06 for transmission by one or more of the one or more antennas XT10. In various embodiments, the amplification through the transmit or receive signal paths may be done solely in the RF circuitry XT06, solely in the FEM XT08, or in both the RF circuitry XT06 and the FEM XT08.

In some embodiments, the FEM circuitry XT08 may include a TX/RX switch to switch between transmit mode and receive mode operation. The FEM circuitry may include a receive signal path and a transmit signal path. The receive signal path of the FEM circuitry may include an LNA to amplify received RF signals and provide the amplified received RF signals as an output (e.g., to the RF circuitry XT06). The transmit signal path of the FEM circuitry XT08 may include a power amplifier (PA) to amplify input RF signals (e.g., provided by RF circuitry XT06), and one or more filters to generate RF signals for subsequent transmission (e.g., by one or more of the one or more antennas XT10).

Processors of the application circuitry XS05/XT05 and processors of the baseband circuitry XS10/XT10 may be used to execute elements of one or more instances of a protocol stack. For example, processors of the baseband circuitry XS10/XT10, alone or in combination, may be used execute Layer 3, Layer 2, or Layer 1 functionality, while processors of the baseband circuitry XS10/XT10 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 11:
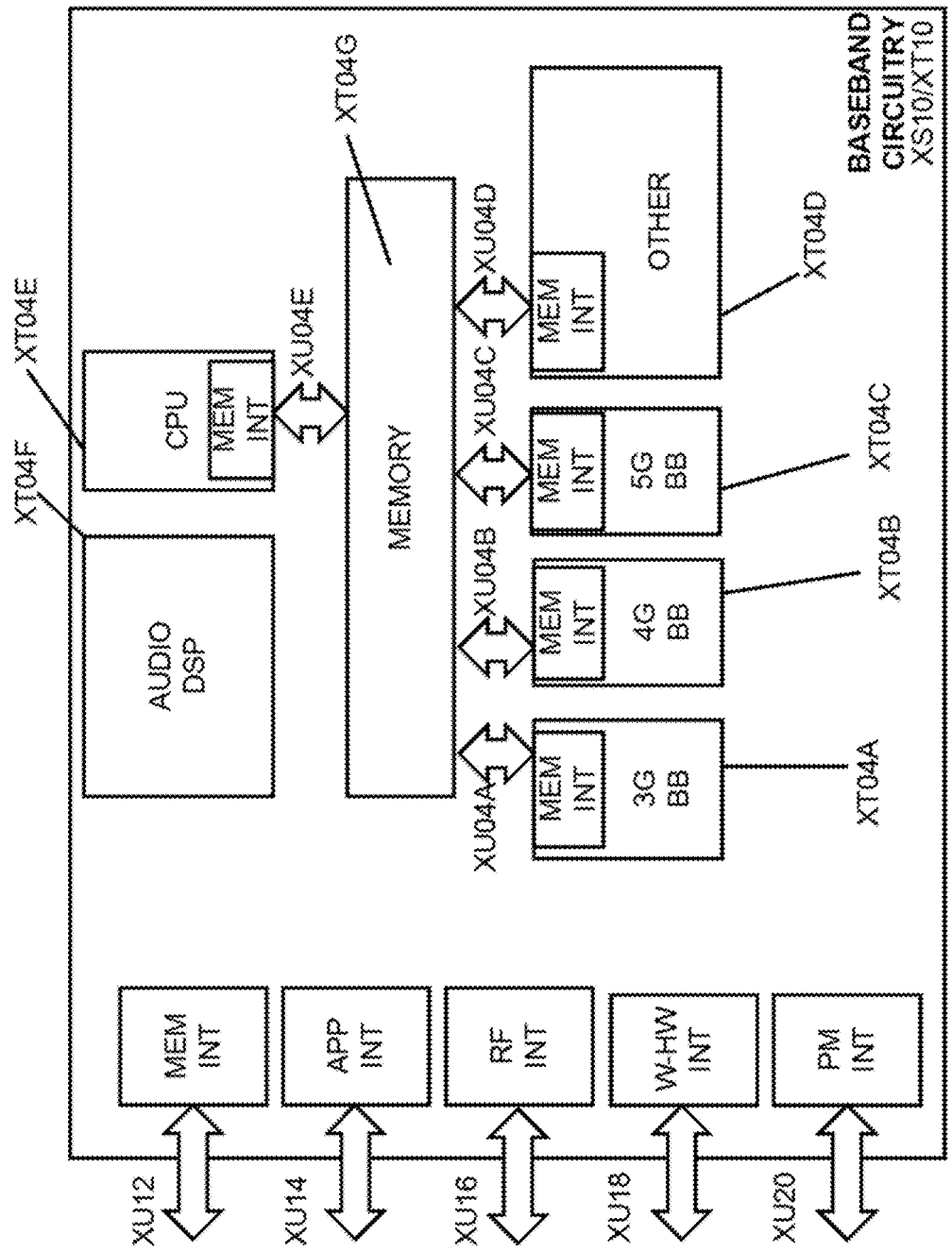
FIG. 11 depicts an example baseband circuitry supporting the embodiments disclosed in FIGS. 1-3, according to various embodiments.

FIG. 11 illustrates example interfaces of baseband circuitry in accordance with some embodiments. As discussed above, the baseband circuitry XS10/XT10 of FIGS. 8-10 may comprise processors XT04A-XT04E and a memory XT04G utilized by said processors. Each of the processors XT04A-XT04E may include a memory interface, XU04A-XU04E, respectively, to send/receive data to/from the memory XT04G.

The baseband circuitry XS10/XT10 may further include one or more interfaces to communicatively couple to other circuitries/devices, such as a memory interface XU12 (e.g., an interface to send/receive data to/from memory external to the baseband circuitry XS10/XT10), an application circuitry interface XU14 (e.g., an interface to send/receive data to/from the application circuitry XS05/XT05 of FIGS. 8-10), an RF circuitry interface XU16 (e.g., an interface to send/receive data to/from RF circuitry XT06 of FIG. 10), a wireless hardware connectivity interface XU18 (e.g., an interface to send/receive data to/from Near Field Communication (NFC) components, Bluetooth® components (e.g., Bluetooth® Low Energy), Wi-Fi® components, and other communication components), and a power management interface XU20 (e.g., an interface to send/receive power or control signals to/from the PMIC XT25.

Figure 12:
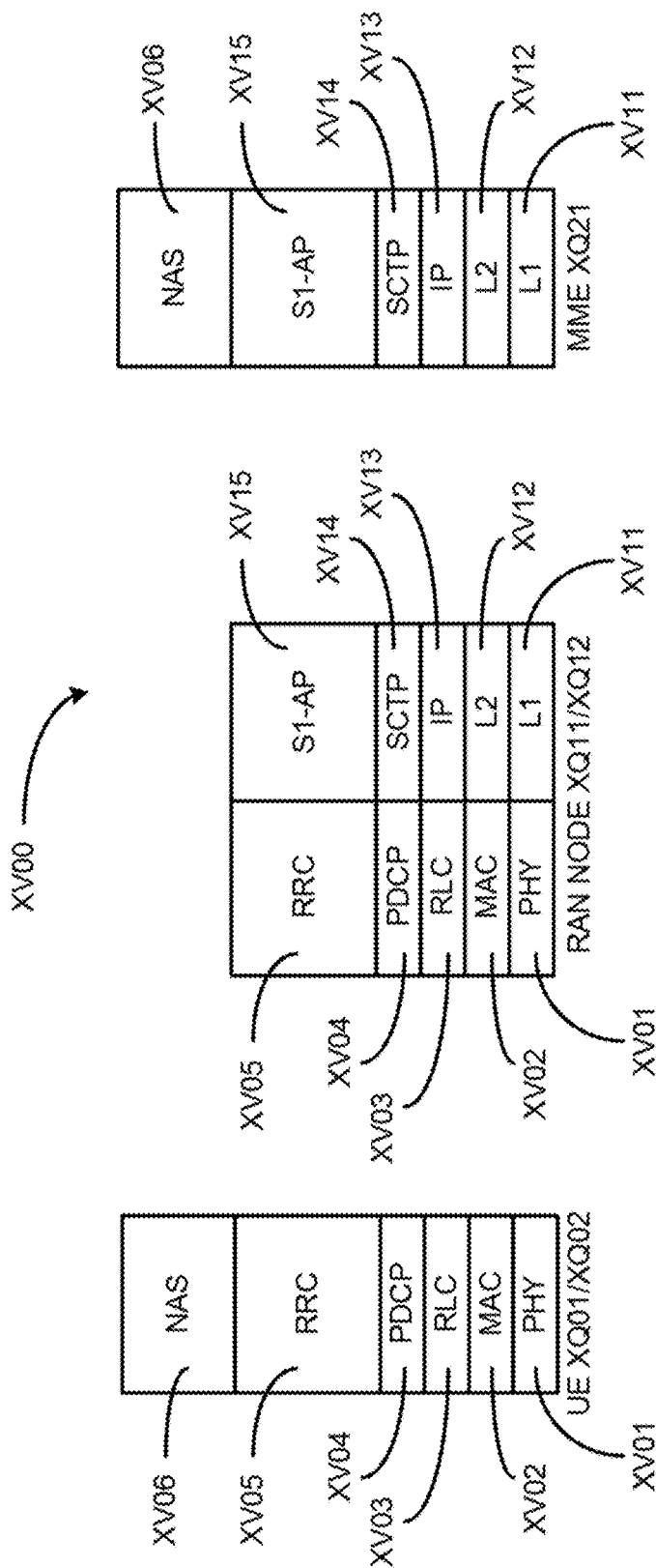
FIG. 12 is an illustration of a control plane protocol stack in accordance with some embodiments.

FIG. 12 is an illustration of a control plane protocol stack in accordance with some embodiments. In this embodiment, a control plane XV00 is shown as a communications protocol stack between the UE XQ01 (or alternatively, the UE XQ02), the RAN node XQ11 (or alternatively, the RAN node XQ12), and the MME XQ21.

The PHY layer XV01 may transmit or receive information used by the MAC layer XV02 over one or more air interfaces. The PHY layer XV01 may further perform link adaptation or adaptive modulation and coding (AMC), power control, cell search (e.g., for initial synchronization and handover purposes), and other measurements used by higher layers, such as the RRC layer XV05. The PHY layer XV01 may still further perform error detection on the transport channels, forward error correction (FEC) coding/decoding of the transport channels, modulation/demodulation of physical channels, interleaving, rate matching, mapping onto physical channels, and Multiple Input Multiple Output (MIMO) antenna processing.

The MAC layer XV02 may perform mapping between logical channels and transport channels, multiplexing of MAC service data units (SDUs) from one or more logical channels onto transport blocks (TB) to be delivered to PHY via transport channels, de-multiplexing MAC SDUs to one or more logical channels from transport blocks (TB) delivered from the PHY via transport channels, multiplexing MAC SDUs onto TBs, scheduling information reporting, error correction through hybrid automatic repeat request (HARD), and logical channel prioritization.

The RLC layer XV03 may operate in a plurality of modes of operation, including: Transparent Mode (TM), Unacknowledged Mode (UM), and Acknowledged Mode (AM). The RLC layer XV03 may execute transfer of upper layer protocol data units (PDUs), error correction through automatic repeat request (ARQ) for AM data transfers, and concatenation, segmentation and reassembly of RLC SDUs for UM and AM data transfers. The RLC layer XV03 may also execute re-segmentation of RLC data PDUs for AM data transfers, reorder RLC data PDUs for UM and AM data transfers, detect duplicate data for UM and AM data transfers, discard RLC SDUs for UM and AM data transfers, detect protocol errors for AM data transfers, and perform RLC re-establishment.

The PDCP layer XV04 may execute header compression and decompression of IP data, maintain PDCP Sequence Numbers (SNs), perform in-sequence delivery of upper layer PDUs at re-establishment of lower layers, eliminate duplicates of lower layer SDUs at re-establishment of lower layers for radio bearers mapped on RLC AM, cipher and decipher control plane data, perform integrity protection and integrity verification of control plane data, control timer-based discard of data, and perform security operations (e.g., ciphering, deciphering, integrity protection, integrity verification, etc.).

The main services and functions of the RRC layer XV05 may include broadcast of system information (e.g., included in Master Information Blocks (MIBs) or System Information Blocks (SIBs) related to the non-access stratum (NAS)), broadcast of system information related to the access stratum (AS), paging, establishment, maintenance and release of an RRC connection between the UE and E-UTRAN (e.g., RRC connection paging, RRC connection establishment, RRC connection modification, and RRC connection release), establishment, configuration, maintenance and release of point to point Radio Bearers, security functions including key management, inter radio access technology (RAT) mobility, and measurement configuration for UE measurement reporting. Said MIBs and SIBs may comprise one or more information elements (IEs), which may each comprise individual data fields or data structures.

The UE XQ01 and the RAN node XQ11 may utilize a Uu interface (e.g., an LTE-Uu interface) to exchange control plane data via a protocol stack comprising the PHY layer XV01, the MAC layer XV02, the RLC layer XV03, the PDCP layer XV04, and the RRC layer XV05.

The non-access stratum (NAS) protocols XV06 form the highest stratum of the control plane between the UE XQ01 and the MME XQ21. The NAS protocols XV06 support the mobility of the UE XQ01 and the session management procedures to establish and maintain IP connectivity between the UE XQ01 and the P-GW XQ23.

The S1 Application Protocol (S1-AP) layer XV15 may support the functions of the S1 interface and comprise Elementary Procedures (EPs). An EP is a unit of interaction between the RAN node XQ11 and the CN XQ20. The S1-AP layer services may comprise two groups: UE-associated services and non UE-associated services. These services perform functions including, but not limited to: E-UTRAN Radio Access Bearer (E-RAB) management, UE capability indication, mobility, NAS signaling transport, RAN Information Management (RIM), and configuration transfer.

The Stream Control Transmission Protocol (SCTP) layer (alternatively referred to as the SCTP/IP layer) XV14 may ensure reliable delivery of signaling messages between the RAN node XQ11 and the MME XQ21 based, in part, on the IP protocol, supported by the IP layer XV13. The L2 layer XV12 and the L1 layer XV11 may refer to communication links (e.g., wired or wireless) used by the RAN node and the MME to exchange information.

The RAN node XQ11 and the MME XQ21 may utilize an S1-MME interface to exchange control plane data via a protocol stack comprising the L1 layer XV11, the L2 layer XV12, the IP layer XV13, the SCTP layer XV14, and the S1-AP layer XV15.

Figure 13:
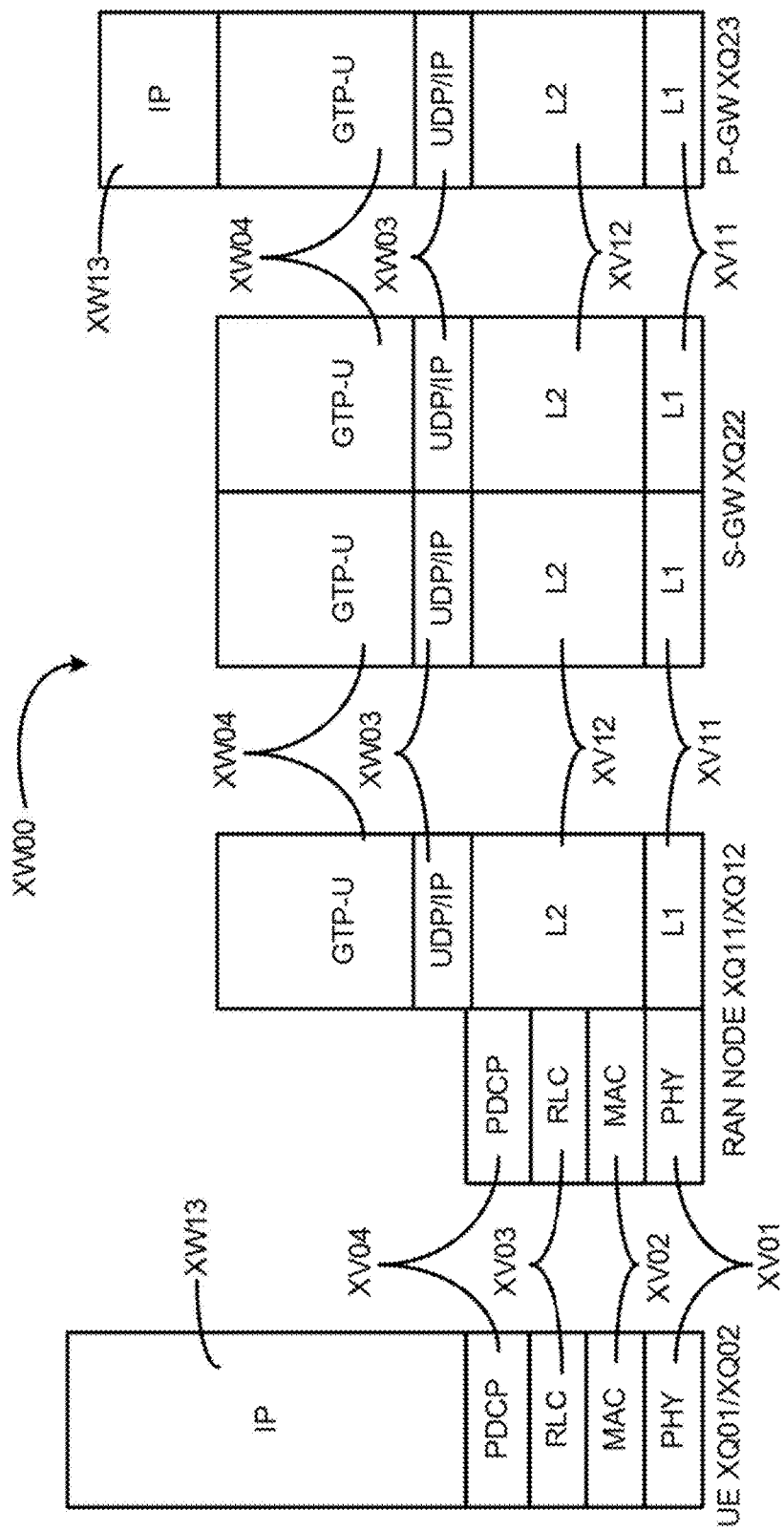
FIG. 13 is an illustration of a user plane protocol stack in accordance with some embodiments.

FIG. 13 is an illustration of a user plane protocol stack in accordance with some embodiments. In this embodiment, a user plane XW00 is shown as a communications protocol stack between the UE XQ01 (or alternatively, the UE XQ02), the RAN node XQ11 (or alternatively, the RAN node XQ12), the S-GW XQ22, and the P-GW XQ23. The user plane XW00 may utilize at least some of the same protocol layers as the control plane XV00. For example, the UE XQ01 and the RAN node XQ11 may utilize a Uu interface (e.g., an LTE-Uu interface) to exchange user plane data via a protocol stack comprising the PHY layer XV01, the MAC layer XV02, the RLC layer XV03, the PDCP layer XV04.

The General Packet Radio Service (GPRS) Tunneling Protocol for the user plane (GTP-U) layer XW04 may be used for carrying user data within the GPRS core network and between the radio access network and the core network. The user data transported can be packets in any of IPv4, IPv6, or PPP formats, for example. The UDP and IP security (UDP/IP) layer XW03 may provide checksums for data integrity, port numbers for addressing different functions at the source and destination, and encryption and authentication on the selected data flows. The RAN node XQ11 and the S-GW XQ22 may utilize an S1-U interface to exchange user plane data via a protocol stack comprising the L1 layer XV11, the L2 layer XV12, the UDP/IP layer W03, and the GTP-U layer W04. The S-GW XQ22 and the P-GW XQ23 may utilize an S5/S8a interface to exchange user plane data via a protocol stack comprising the L1 layer XV11, the L2 layer XV12, the UDP/IP layer XW03, and the GTP-U layer W04. As discussed above with respect to FIG. 12, NAS protocols support the mobility of the UE XQ01 and the session management procedures to establish and maintain IP connectivity between the UE XQ01 and the P-GW XQ23.

Figure 14:
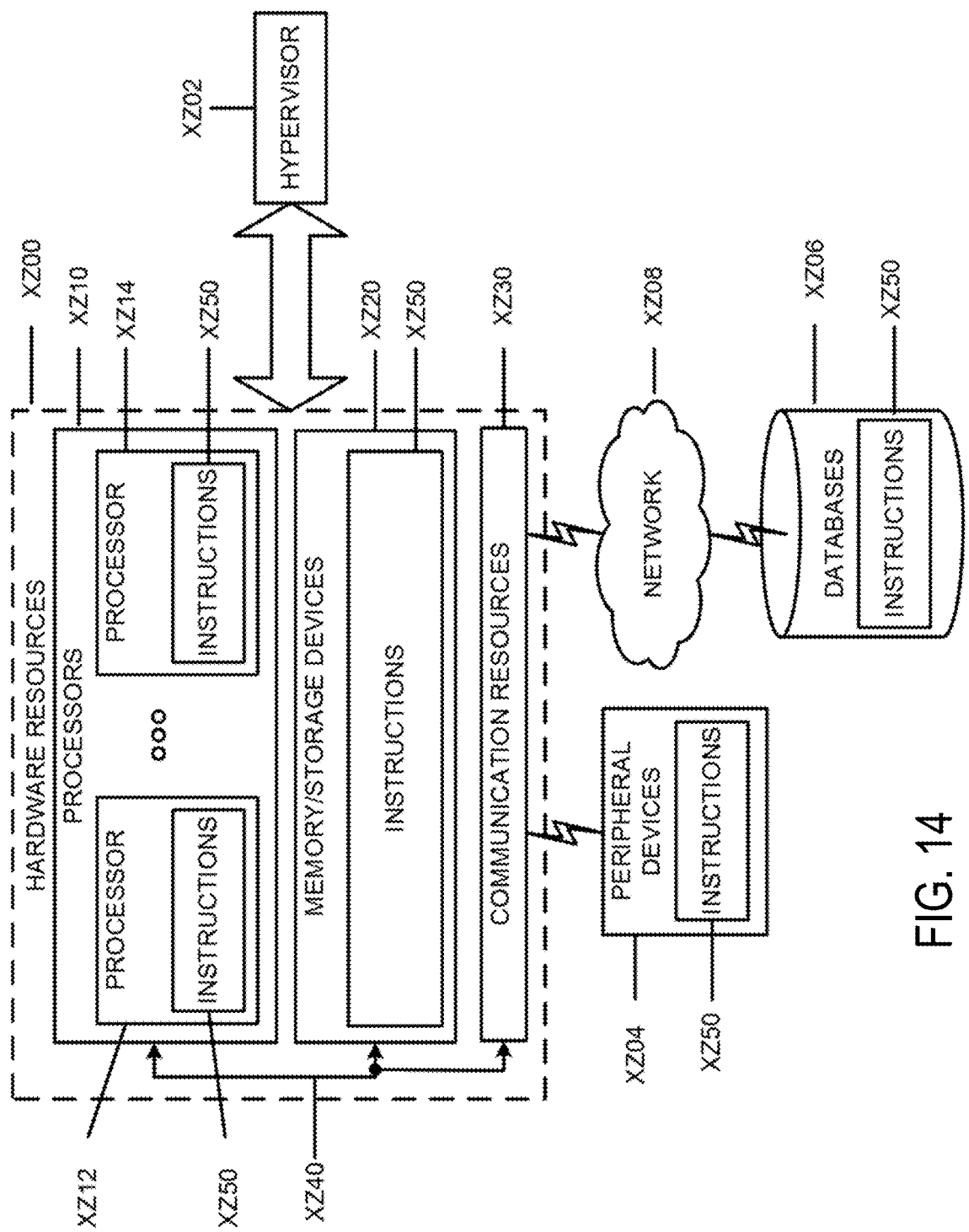
FIG. 14 depicts the components of an example network connected device such as a UE, according to various embodiments.

FIG. 14 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 14 shows a diagrammatic representation of hardware resources XZ00 including one or more processors (or processor cores) XZ10, one or more memory/storage devices XZ20, and one or more communication resources XZ30, each of which may be communicatively coupled via a bus XZ40. As used herein, the term "computing resource", "hardware resource", etc., may refer to a physical or virtual device, a physical or virtual component within a computing environment, and/or physical or virtual component within a particular device, such as computer devices, mechanical devices, memory space, processor/CPU time and/or processor/CPU usage, processor and accelerator loads, hardware time or usage, electrical power, input/output operations, ports or network sockets, channel/link allocation, throughput, memory usage, storage, network, database and applications, and/or the like. For embodiments where node virtualization (e.g., NFV) is utilized, a hypervisor XZ02 may be executed to provide an execution environment for one or more network slices/subslices to utilize the hardware resources XZ00. A "virtualized resource" may refer to compute, storage, and/or network resources provided by virtualization infrastructure to an application, device, system, etc.

The processors XZ10 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor XZ12 and a processor XZ14.

The memory/storage devices XZ20 may include main memory, disk storage, or any suitable combination thereof. The memory/storage devices XZ20 may include, but are not limited to any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources XZ30 may include interconnection or network interface components or other suitable devices to communicate with one or more peripheral devices XZ04 or one or more databases XZ06 via a network XZ08. For example, the communication resources XZ30 may include wired communication components (e.g., for coupling via a Universal Serial Bus (USB)), cellular communication components, NFC components, Bluetooth® components (e.g., Bluetooth® Low Energy), Wi-Fi® components, and other communication components. As used herein, the term "network resource" or "communication resource" may refer to computing resources that are accessible by computer devices via a communications network. The term "system resources" may refer to any kind of shared entities to provide services, and may include computing and/or network resources. System resources may be considered as a set of coherent functions, network data objects or services, accessible through a server where such system resources reside on a single host or multiple hosts and are clearly identifiable.

Instructions XZ50 may comprise software, a program, an application, an applet, an app, or other executable code for causing at least any of the processors XZ10 to perform any one or more of the methodologies discussed herein. The instructions XZ50 may reside, completely or partially, within at least one of the processors XZ10 (e.g., within the processor's cache memory), the memory/storage devices XZ20, or any suitable combination thereof. Furthermore, any portion of the instructions XZ50 may be transferred to the hardware resources XZ00 from any combination of the peripheral devices XZ04 or the databases XZ06. Accordingly, the memory of processors XZ10, the memory/storage devices XZ20, the peripheral devices XZ04, and the databases XZ06 are examples of computer-readable and machine-readable media.

In some embodiments, the electronic device(s), network(s), system(s), chip(s) or component(s), or portions or implementations thereof, of any figure herein may be configured to perform one or more processes, techniques, or methods as described herein, or portions thereof.

It will be appreciated that the configurations disclosed herein are exemplary in nature, and that these specific embodiments are not to be considered in a limiting sense, because numerous variations are possible. The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

EXAMPLES

The following examples pertain to further embodiments:

Example 1 is an apparatus, comprising processing circuitry; and control circuitry coupled to the processing circuitry, wherein the control circuitry is to detect, with at least one downlink reference signal (RS), a beam failure instance of a beam in at least one of a plurality of active bandwidth parts (BWPs) or component carriers (CCs) comprising the beam, each of the plurality of active BWPs or CCs associated with at least one downlink RS and an independent beam failure detection (BFD) counter, and the processing circuitry is to cause the beam failure instance to be declared.

Example 2 includes the subject matter of example 1, or some other example herein, wherein the control circuitry is to increment the BFD counter associated with a BWP or CC each time a quality of an RS instance of the at least one RS associated with the BWP or CC falls below a predetermined threshold.

Example 3 includes the subject matter of example 1 or 2, or some other example herein, wherein a first RS instance of the at least one downlink RS and a second RS instance of the at least one downlink RS define a RS periodicity.

Example 4 includes the subject matter of example 3, or some other example herein, wherein the control circuitry is to detect the beam failure instance based upon the quality of an instance of the at least one downlink RS that falls within a BFD period that is equal to or greater than the RS periodicity.

Example 5 includes the subject matter of example 4, or some other example herein, wherein the control circuitry is to detect the beam failure instance when the quality of each of a predetermined number of instances of the downlink RS within the BFD period falls below a predetermined threshold.

Example 6 includes the subject matter of example 5, or some other example herein, wherein the BFD counter associated with the at least one active BWP or CC is incremented each time an instance of the at least one downlink RS falls below the predetermined threshold, and the control circuitry is to detect the beam failure instance when the BFD counter meets or exceeds the predetermined number of instances.

Example 7 includes the subject matter of example 5 or 6, or some other example herein, wherein the predetermined number of downlink RS instances is fixed, is to be configured by signaling from a layer above the MAC or PHY layer, or is determined by a user equipment.

Example 8 includes the subject matter of example 3, or some other example herein, wherein a beam failure detection (BFD) period is less than the RS periodicity, and the control circuitry is to detect the beam failure instance with the quality of at least a downlink RS instance most recent to the BFD period when no downlink RS instance falls within the BFD period.

Example 9 includes the subject matter of any of examples 1-8, or some other example herein, wherein the control circuitry is to initiate a beam failure recovery process on the at least one active BWP or CC upon beam failure instance detection.

Example 10 includes the subject matter of any of examples 1-9, or some other example herein, wherein the control circuitry is to maintain an independent beam failure detection process and beam failure recovery process for each of the plurality of active BWPs or CCs.

Example 11 includes the subject matter of any of examples 1-10, or some other example herein, wherein the processing circuitry is to declare the beam failure instance when the beam failure instance is detected in all or a subset of the plurality of active BWPs or CCs comprising the beam.

Example 12 includes the subject matter of any of examples 1-11, or some other example herein, wherein the apparatus is a user equipment (UE), and the number of downlink RSs or a number of control resource sets (CORESETs) does not exceed a predetermined amount, the amount based upon the UE's capabilities.

Example 13 includes the subject matter of example 12, or some other example herein, wherein at least one of the number of CORESETs includes a search space set for monitoring a physical downlink control channel (PDCCH) following transmission of a beam failure recovery request, and the at least one of the number of CORESETs may be associated with one of the plurality of active BWPs or CCs.

Example 14 is one or more non-transitory computer-readable media (CRM) comprising instructions that, when executed by one or more processors, cause the one or more processors to generate a first and a second beam failure detection (BFD) reference signal (RS); detect an individual beam failure instance based on the quality of either the first or second BFD RS falling below a predetermined threshold; and report the individual beam failure instance; wherein the first and second BFD RSs are associated with one or more active bandwidth parts (BWPs), or component carriers (CCs).

Example 15 includes the subject matter of example 14, or some other example herein, wherein the instructions are to further cause the one or more processors to initiate a beam failure recovery process upon reporting of the beam failure instance.

Example 16 includes the subject matter of example 14 or 15, or some other example herein, wherein the first and second BFD RSs define a RS periodicity, the BFD defines a BFD periodicity that is equal to or longer than the RS periodicity, and wherein the instructions are to further cause the one or more processors to detect the individual beam failure instance when the quality of at least one BFD RS within a BFD period falls below the predetermined threshold.

Example 17 includes the subject matter of example 14 or 15, or some other example herein, wherein the first and second BFD RSs define a RS periodicity, and wherein the instructions are to further cause the one or more processors to detect, when no BFD RS is within a BFD period, the individual beam failure instance when the quality of a BFD RS most recent to the BFD period falls below the predetermined threshold.

Example 18 is one or more non-transitory computer-readable media (CRM) comprising instructions that, when executed by one or more processors, cause the one or more processors to monitor a plurality of configured BWPs/CCs for instances of beam failure; detect one or more individual beam failure instances based on multiple downlink reference signal resources with one or more active bandwidth parts (BWPs) or component carriers (CCs); and generate a report to declare a BFD based on the detection of the one or more individual beam failure instances.

Example 19 includes the subject matter of example 18, or some other example herein, wherein the instructions are to further cause the one or more processors to transmit a plurality of reference signals within a beam failure detection (BFD) period.

Example 20 includes the subject matter of example 18 or 19, or some other example herein, wherein the instructions are to further cause the one or more processors to reset a BFD counter when either no beam failure instance is detected within the BFD period, or a user equipment declares a radio link failure.

Example 21 includes the subject matter of any of examples 18-20, or some other example herein, wherein the instructions are to further cause the one or more processors to maintain a BFD counter and beam failure recovery (BFR) timer for each BWP or CC.

Example 22 includes the subject matter of any of examples 18-21, or some other example herein, wherein the instructions are to further cause the one or more processors to trigger a physical random access channel (PRACH)-based BFR when a beam failure instance is detected in a plurality of BWPs or CCs.

Example 23 is an apparatus, comprising detection means for detecting individual beam failure instances based on multiple downlink reference signal resources with one or more active bandwidth parts (BWPs) or component carriers (CCs); and reporting means for reporting the individual beam failure instances.

Example 24 includes the subject matter of example 23, or some other example herein, further comprising repair means for initiating a beam failure recovery process upon detection, by the detection means of an individual beam failure instance.

Example 25 includes the subject matter of example 23 or 24, or some other example herein, wherein the detection means is to generate a plurality of beam failure detection reference signals for each of the one or more active BWPs or CCs.

What is claimed is:

1. One or more non-transitory computer readable media (CRM) comprising instructions stored thereon that, when executed by one or more processors of a user equipment (UE), cause the UE to:
decode an information element from a radio resource control (RRC) message, wherein the information element includes configuration information for one or more candidate beams for beam failure recovery in case of beam failure detection, and the configuration information includes a list of downlink reference signals (RSs) of the one or more candidate beams,
detect, based on at least one downlink reference signal (RS), a beam failure of a first candidate beam of the one or more candidate beams in at least one of a plurality of active bandwidth parts (BWPs) based on a beam failure detection (BFD) counter associated with the at least one active BWP, and declare, upon detection, the beam failure, wherein a first downlink RS instance and a second downlink RS instance of the at least one downlink RS define a RS periodicity, and wherein a beam failure detection (BFD) period is less than the RS periodicity, and wherein the instructions cause the UE to detect the beam failure based on a quality of a downlink RS instance most recent to the BFD period when no downlink RS instance falls within the BFD period.

2. The one or more CRM of claim 1, wherein the instructions are to further cause the UE to increment the BFD counter upon detection of an instance of the beam failure in the associated at least one active BWP.

3. The one or more CRM of claim 2, wherein the instructions are to further cause the UE to declare the beam failure upon the BFD counter reaching a predetermined maximum count.

4. The one or more CRM of claim 3, wherein the predetermined maximum count is included in the RRC message or another RRC message.

5. The one or more CRM of claim 4, wherein the predetermined maximum count is included in a second information element decoded from the RRC message or another RRC message.

6. The one or more CRM of claim 1, wherein the instructions are to further cause the UE to increment the BFD counter each time a quality measurement on an RS from the list of downlink RSs of the first candidate beam associated with the BWP falls below a predetermined threshold.

7. The one or more CRM of claim 1, wherein the instructions are to further cause the UE to encode the beam failure declaration for transmission to a next-generation Node B.

8. The one or more CRM of claim 1, wherein the instructions are to further cause the UE to detect a second beam failure of a second candidate beam of the one or more candidate beams in a second one of the plurality of active bandwidth parts (BWPs) based on a second beam failure detection (BFD) counter associated with the second active BWP.

9. The one or more CRM of claim 8 wherein the instructions are further to cause the UE to increment the second BFD counter upon detection of an instance of the second beam failure in the associated second active BWP.

10. A user equipment (UE), comprising:

processing circuitry to:

decode an information element from a radio resource control (RRC) message, wherein the information element includes configuration information for one or more candidate beams for beam failure recovery in case of beam failure detection, and the configuration information includes a list of downlink reference signals (RS) of the one or more candidate beams;

detect a beam failure of a first candidate beam of the one or more candidate beams in at least one of a plurality of active bandwidth parts (BWPs) based on a beam failure detection (BFD) counter associated with the at least one active BWP, and declare, upon detection, the beam failure instance; and a memory interface to store the received RRC message, wherein a first downlink RS instance and a second downlink RS instance of the at least one downlink RS define a RS periodicity, and wherein a beam failure detection (BFD) period is less than the RS periodicity, and wherein the processing circuitry is configured to detect the beam failure based on a quality of at least a downlink RS instance most recent to the BFD period and based on no downlink RS instance falling within the BFD period.

11. The UE of claim 10, wherein the processing circuitry is to further increment the BFD counter upon detection of an instance of the beam failure in the associated at least one active BWP.

12. The UE of claim 11, wherein the processing circuitry is to further declare the beam failure upon the BFD counter reaching a predetermined maximum count.

13. The UE of claim 12, wherein the processing circuitry is to decode the predetermined maximum count from the RRC message or another RRC message.

14. The UE of claim 13, wherein the processing circuitry is to decode the predetermined maximum count from a second information element in the RRC message or another RRC message.

15. The UE of claim 10, wherein the processing circuitry is to further increment the BFD counter each time a quality measurement on an RS from the list of downlink RSs of the first candidate beam associated with the BWP falls below a predetermined threshold.

16. The UE of claim 10, wherein the processing circuitry is to further encode the beam failure declaration for transmission to a next-generation Node B.

17. The UE of claim 10, wherein the processing circuitry is further configured to detect a second beam failure of a second candidate beam of the one or more candidate beams in a second one of the plurality of active bandwidth parts (BWPs) based on a second beam failure detection (BFD) counter associated with the second active BWP.

18. The UE of claim 17, wherein the processing circuitry is further configured to increment the second BFD counter upon detection of an instance of the second beam failure in the associated second active BWP.

19. A method of operating a user equipment (UE), comprising:

decoding an information element from a radio resource control (RRC) message, wherein the information element includes configuration information for one or more candidate beams for beam failure recovery in case of beam failure detection, and the configuration information includes a list of downlink reference signals (RSs) of the one or more candidate beams, detecting, based on at least one downlink reference signal (RS), a beam failure of a first candidate beam of the one or more candidate beams in at least one of a plurality of active bandwidth parts (BWPs) based on a beam failure detection (BFD) counter associated with the at least one active BWP, and declaring, upon detection, the beam failure, wherein a first downlink RS instance and a second downlink RS instance of the at least one downlink RS define a RS periodicity, and wherein a beam failure detection (BFD) period is less than the RS periodicity, and wherein the beam failure instance is detected based on a quality of at least a downlink RS instance most recent to the BFD period and based on no downlink RS instance falling within the BFD period.

20. The method of claim 19, further comprising incrementing the BFD counter upon detection of an instance of the beam failure in the associated at least one active BWP.

21. The method of claim 20, further comprising declaring the beam failure upon the BFD counter reaching a predetermined maximum count.

22. The method of claim 21, wherein the predetermined maximum count is included in the RRC message or another RRC message.

23. The method of claim 19, further comprising incrementing the BFD counter each time a quality measurement on an RS from the list of downlink RSs of the first candidate beam associated with the BWP falls below a predetermined threshold.

24. The method of claim 19, further comprising encoding the beam failure declaration for transmission to a next-generation Node B.

* * * * *